United States Patent
Doyle et al.

(10) Patent No.: US 12,130,357 B2
(45) Date of Patent: Oct. 29, 2024

(54) ANTENNA SLOT ARRAY CONFIGURATIONS AND RELATED VEHICLE SENSOR SIGNAL PATTERNS

(71) Applicant: Magna Electronics, LLC, Southfield, MI (US)

(72) Inventors: Scott B. Doyle, Sudbury, MA (US); Angelos Alexanian, Lexington, MA (US); Konstantinos Konstantinidis, Schweinfurt (DE)

(73) Assignee: Magna Electronics, LLC, Southfield, MI (US)

( * ) Notice: Subject to any disclaimer, the term of this patent is extended or adjusted under 35 U.S.C. 154(b) by 430 days.

(21) Appl. No.: 17/555,363

(22) Filed: Dec. 17, 2021

(65) Prior Publication Data

US 2023/0194703 A1  Jun. 22, 2023

(51) Int. Cl.
| | |
|---|---|
| *G01S 13/931* | (2020.01) |
| *H01Q 1/32* | (2006.01) |
| *H01Q 1/42* | (2006.01) |

(52) U.S. Cl.
CPC ......... *G01S 13/931* (2013.01); *H01Q 1/3233* (2013.01); *H01Q 1/42* (2013.01); *G01S 2013/93271* (2020.01)

(58) Field of Classification Search
CPC ........ G01S 13/931; G01S 2013/93271; H01Q 1/3233; H01Q 1/42; H01Q 1/36; H01Q 21/005
See application file for complete search history.

(56) References Cited

U.S. PATENT DOCUMENTS

| | | | |
|---|---|---|---|
| 2,990,547 | A | 6/1961 | McDougal |
| 3,231,894 | A | 1/1966 | Nagal |
| 6,483,481 | B1 | 11/2002 | Sievenpiper et al. |
| 7,132,905 | B2 | 11/2006 | Sano |
| 8,058,998 | B2 | 11/2011 | Burnside et al. |
| 8,779,995 | B2 | 7/2014 | Kirino et al. |
| 8,803,638 | B2 | 8/2014 | Kildal |
| 9,153,851 | B2 | 10/2015 | Nakamura |
| 9,252,475 | B2 | 2/2016 | Milyakh et al. |

(Continued)

FOREIGN PATENT DOCUMENTS

| | | |
|---|---|---|
| CN | 102931492 | 2/2015 |
| CN | 105633585 | 6/2016 |

(Continued)

OTHER PUBLICATIONS

CN102931492, Feb. 11, 2015, Beijing Institute of Telemetry Technology, Machine Translation (9 pages).

(Continued)

*Primary Examiner* — Timothy A Brainard
*Assistant Examiner* — Kenneth W Good
(74) *Attorney, Agent, or Firm* — Matthew D. Thayne; Thayne and Davis LLC

(57) ABSTRACT

Waveguide and/or antenna structures for use in RADAR sensor assemblies and the like. In some embodiments, an antenna module for a vehicle sensor may comprise a receive (RX) array of elongated RX antenna slots and a transmit (TX) array of TX antenna slots. The TX array may comprise both one or more vertically-shifted TX antenna slots and one or more high-gain and/or squinted TX antenna arrays, each comprising a plurality of high-gain antenna slots.

19 Claims, 10 Drawing Sheets

(56) References Cited

U.S. PATENT DOCUMENTS

| | | |
|---|---|---|
| 9,666,931 B2 | 5/2017 | Suzuki |
| 10,090,600 B2 | 10/2018 | Kirino et al. |
| 10,103,448 B1* | 10/2018 | Izadian ................. H01Q 21/005 |
| 10,164,344 B2 | 12/2018 | Kirino et al. |
| 10,381,741 B2 | 8/2019 | Kirino et al. |
| 11,581,657 B1* | 2/2023 | Emara ................... H01Q 21/005 |
| 11,923,609 B2* | 3/2024 | Park ..................... H01Q 1/3233 |
| 2003/0117245 A1 | 6/2003 | Okajima et al. |
| 2004/0066346 A1 | 8/2004 | Huor |
| 2007/0152868 A1 | 7/2007 | Schoebel |
| 2009/0153432 A1 | 6/2009 | Manasson et al. |
| 2011/0043423 A1 | 2/2011 | Kirino et al. |
| 2011/0050356 A1 | 3/2011 | Nakamura et al. |
| 2014/0354498 A1 | 12/2014 | Balma et al. |
| 2016/0020522 A1 | 1/2016 | Sano et al. |
| 2016/0254582 A1 | 9/2016 | Jensen |
| 2017/0040703 A1 | 2/2017 | Cheng et al. |
| 2017/0084971 A1 | 3/2017 | Kildal et al. |
| 2017/0187121 A1 | 6/2017 | Kirino et al. |
| 2017/0279193 A1 | 9/2017 | Chauloux |
| 2018/0013208 A1 | 1/2018 | Izadian et al. |
| 2018/0269591 A1 | 9/2018 | Kirino et al. |
| 2018/0301816 A1 | 10/2018 | Kamo et al. |
| 2018/0351261 A1 | 12/2018 | Kamo et al. |
| 2019/0081395 A1* | 3/2019 | Daniel ..................... H01Q 1/38 |
| 2019/0379136 A1 | 12/2019 | Kirino et al. |
| 2020/0028260 A1* | 1/2020 | Achour ................. G01S 13/426 |
| 2021/0194150 A1* | 6/2021 | Lim ..................... H01Q 21/064 |
| 2021/0249784 A1* | 8/2021 | Alexanian ............... H01P 1/162 |

FOREIGN PATENT DOCUMENTS

| | | |
|---|---|---|
| CN | 106207357 | 12/2016 |
| EP | 2267841 | 12/2010 |
| SE | 543704 C2 | 6/2021 |
| WO | 2017078183 | 5/2017 |
| WO | 2019022651 | 1/2019 |
| WO | 2021122725 | 6/2021 |

OTHER PUBLICATIONS

Cn106207357, Dec. 7, 2016, Chengdu Xanaway Technology Co., Ltd., Machine Translation (58 pages).

Goussetis, G. et al., Tailoring the AMC and EBG characteristics of periodic metallic arrays printed on grounded dielectric substrate, IEE Transactions on Antennas and Propagation, vol. 54, No. 1, Jan. 2006 (8 pages).

Zhang, Y. et al., Planar Artificial Magnetic Conductors and Patch Antennas, IEE Transactions on Antennas and Propagation, vol. 51, No. 10, Oct. 2003 (9 pages).

Mosallaei, H., et al., Antenna Miniaturization and Bandwidth Enhancement Using a Reactive Impedance Substrate, IEE Transactions on Antennas and Propagation, vol. 52, No. 9, Sep. 2004 (12 pages).

* cited by examiner

ANTENNA SLOT ARRAY CONFIGURATIONS AND RELATED VEHICLE SENSOR SIGNAL PATTERNS

SUMMARY

Disclosed herein are various embodiments of waveguide and/or antenna structures having features for altering and/or improving signal transmission and/or receiving characteristics, such as increasing signal strength within one or more particular, desired angle ranges. In preferred embodiments, such structures may be used in sensor assemblies, such as RADAR or other sensor modules for vehicles.

In some embodiments, such features may comprise grooves configured to mimic antenna slots, such as by providing an identical, substantially identical, or at least similar length, width, and/or shape. Alternatively, or additionally in some embodiments, one or more isolation grooves may be provided, such as arrays of isolation grooves that may be positioned in between adjacent antenna slots. Some embodiments may further comprise oscillating/"wavy" antenna slots having corresponding similar oscillating/wavy antenna slot grooves.

It should also be understood that any of the mimicking grooves may, in some embodiments, be replaced with slots that extend all the way through the structure into which they are formed. However, it is important to note that such slots should be distinguished from the "antenna slots" described herein in that they do not accept or direct electromagnetic radiation to or from electronics of the assembly. In other words, unlike an antenna slot, other slots or grooves disclosed herein, including but not limited to a mimicking slot extending through an antenna slot of a RADAR or other sensor assembly, is configured to alter, improve, and/or redirect signals from an antenna slot in the assembly rather than to simply accept and/or transmit signals to and/or from the electronic circuits of the assembly.

Thus, as used herein, the term "antenna slot" should be considered to encompass slots that are configured to transmit and/or receive electromagnetic signals/energy to and/or from electronics on the assembly, such as circuits on a printed circuit board of the assembly. By contrast, as used herein, an "auxiliary slot" or an "auxiliary groove" should be considered to encompass a slot or groove that facilitates a desired improvement, alternation, and/or adjustment of electromagnetic signals/energy being transmitted and/or received from an antenna slot of the same assembly, such as in some cases an adjacent antenna slot. The distinction between an "auxiliary slot" and an "auxiliary groove" is that an "auxiliary groove" may or may not extend entirely through the structure into which it is formed to form an opening, whereas an "auxiliary slot," like an antenna slot, does form such as opening.

Various embodiments disclosed herein may also relate to configurations of antenna modules/sensors/assemblies that include both TX and RX antenna sections, along with various details about their relative placement, spacing, and/or structures. These features may provide for desired antenna beam configurations on, for example, a vehicle, to target particular regions at particular distances, as desired.

In a more particular example of an antenna module for a vehicle sensor according to some embodiments, the module may comprise a receive (RX) array of elongated RX antenna slots and a transmit (TX) array of TX antenna slots. The TX array of TX antenna slots may comprise an elongated TX antenna slot, which elongated TX antenna slot may be shifted vertically in a vertical direction along an axis of the elongated TX antenna slot relative to each of the elongated RX antenna slots of the RX array. The TX array may further comprise a high-gain TX antenna array positioned adjacent to the elongated TX antenna slot, which may comprise a plurality of high-gain antenna slots formed in a plurality of columns. In some embodiments, each of the plurality of high-gain antenna slots may be shorter in length in a direction along the axis of the elongated TX antenna slot than the elongated TX antenna slot.

In some embodiments, the TX array of TX antenna slots may further comprise a second elongated TX antenna slot. In some such embodiments, the high-gain TX antenna array may be positioned in between the elongated TX antenna slot and the second elongated TX antenna slot. In some embodiments, the second elongated TX antenna slot may be shifted vertically in the vertical direction along the axis of the elongated TX antenna slot relative to the elongated TX antenna slot. In some such embodiments, the second elongated RX antenna slot may be positioned adjacent to a peripheral edge of the antenna module.

In some embodiments, the antenna module may comprise a vehicle RADAR module.

In some embodiments, the second elongated TX antenna slot may be spaced apart in a horizontal direction perpendicular to the vertical direction from the elongated TX antenna slot by a distance corresponding to about five wavelengths of the electromagnetic radiation used in the antenna module.

In some embodiments, the high-gain TX antenna array may comprise a squinted-beam TX antenna array configured to direct an electromagnetic signal at an angle relative to an electromagnetic signal associated with the elongated TX antenna slot.

In an example of a vehicle antenna assembly according to some embodiments, the assembly may comprise a receive (RX) array of elongated RX antenna slots and a transmit (TX) array of TX antenna slots. The TX array of TX antenna slots may comprise a boresight beam array of one or more TX antenna slots configured to direct a first electromagnetic signal in a first direction; and a squinted beam array of TX antenna slots configured to direct a second electromagnetic signal in a second direction at an angle relative to the first electromagnetic signal. In some embodiments, the squinted beam array of TX antenna slots may be configured to direct the second electromagnetic signature in a direction that overlaps with the first electromagnetic signal.

In some embodiments, the TX array of TX antenna slots may further comprise a second squinted beam array of TX antenna slots. The second squinted beam array of TX antenna slots may be configured to direct a third electromagnetic signal in a third direction at a second angle relative to the first electromagnetic signal, which third electromagnetic signal may, in some embodiments, overlap with the first electromagnetic signal. In some embodiments, the second angle may extend in a direction opposite the first angle relative to the first direction. In some such embodiments, the second angle may be between about 30 degrees and about 60 degrees. In some such embodiments, the second angle may be between about 30 degrees and about 45 degrees.

In some embodiments, the boresight beam array of TX antenna slots may be vertically shifted along an elongated axis of the boresight beam array with respect to at least one of the squinted beam array and the second squinted beam array.

In some embodiments, the boresight beam array of one or more TX antenna slots may be vertically shifted along the elongated axis of the boresight beam array with respect to both the squinted beam array and the second squinted beam array.

In some embodiments, the boresight beam array may comprise only a single TX antenna slot. Of course, the boresight beam array may therefore comprise multiple TX antenna slots in other embodiments.

In some embodiments, the boresight beam array may comprise at least one TX antenna slot that is vertically shifted relative to at least one other TX antenna slot along an axis of the at least one TX antenna slot.

In some embodiments, the boresight beam array may comprise only two TX antenna slots. In some such embodiments, both of the two TX antenna slots fall within a vertical footprint of the squinted beam array.

In a specific example of a vehicle antenna assembly according to some embodiments, the assembly may comprise a receive (RX) array of elongated RX antenna slots. In some embodiments, at least one of the elongated RX antenna slots may comprise a shifted, elongated RX antenna slot that is shifted vertically in a vertical direction along an axis of the shifted, elongated RX antenna slot relative to each of the other elongated RX antenna slots of the RX array.

In some embodiments, the assembly may further comprise a transmit (TX) array of elongated TX antenna slots, some or all of which may differ in shape and/or length relative to each of the elongated RX antenna slots of the RX array.

In some embodiments, each of the elongated TX antenna slots may intermittently oscillate on opposite sides of its respective elongated axis along at least a portion of its respective elongated axis.

In some embodiments, each of the elongated RX antenna slots may extend in a straight line, or at least substantially along a straight line.

In some embodiments, the vehicle antenna module may comprise a RADAR module.

In some embodiments, the shifted, elongated RX antenna slot may be shifted by a distance corresponding to between about 0.5 and about 1.5 wavelengths of the electromagnetic radiation used in the vehicle antenna module. In some such embodiments, the shifted, elongated RX antenna slot may be shifted by a distance corresponding to about one-half of a wavelength of the electromagnetic radiation used in the vehicle antenna module.

In some embodiments, one or more (in some cases, each) of the elongated RX antenna slots may be at least substantially equally spaced apart from one another in a horizontal direction perpendicular to the vertical direction.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
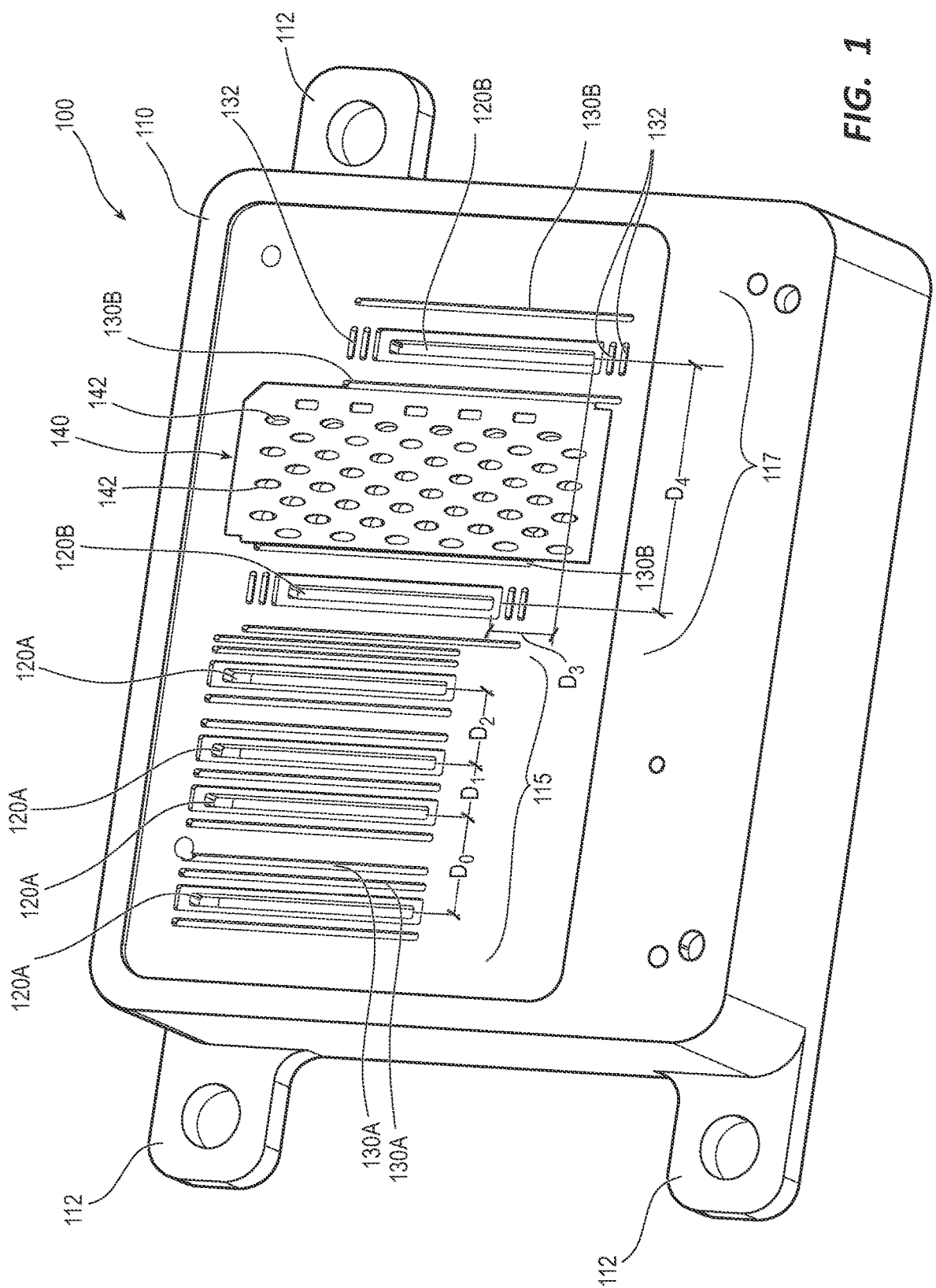
FIG. 1 is a perspective view of an antenna module according to some embodiments.

It will be readily understood that the components of the present disclosure, as generally described and illustrated in the drawings herein, could be arranged and designed in a wide variety of different configurations. Thus, the following more detailed description of the embodiments of the apparatus is not intended to limit the scope of the disclosure but is merely representative of possible embodiments of the disclosure. In some cases, well-known structures, materials, or operations are not shown or described in detail.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

FIG. 1 depicts an antenna and/or waveguide assembly 100 that defines, either in whole or in part, one or more waveguides therein and may comprise a portion of, for example, an antenna module, which antenna module may comprise one or more antennae. Waveguide/antenna/sensor assembly 100 may therefore be incorporated into or otherwise used with a vehicle sensor, such as a RADAR sensor assembly, according to some embodiments.

As depicted in FIG. 1, assembly 100 comprises a portion, such as a layer, casting, and/or block, that comprises and/or defines a series of antenna slots and/or grooves that are configured to transmit, receive, and/or alter electromagnetic signals. In the depicted embodiment, a body 110 containing such slots/grooves is depicted having a series of mounting tabs 112 protruding therefrom. Any of the various slots, grooves, waveguides, or other structures and/or features described herein may be formed directly into the body 110, such as by way of a die cast mold or the like or may be formed into one or more layers or other structures coupled to body 110. Alternatively, body 110 may be formed from an injection molding process and/or may comprise metallized plastic or the like.

In the depicted embodiment, assembly 100 comprises a receiving or "RX" section 115 and an adjacent transmission or "TX" section 117. RX section 115 comprises a series of elongated slots, each of which is positioned and configured to receive electromagnetic radiation therethrough and may therefore be considered an example of an "antenna structure" of assembly 100. It should be understood, however, that one or more slots or another antenna structure may be, in alternative embodiments, formed in another portion of the assembly/module and/or formed in an alternative manner. For example, in some embodiments, a slot may be formed within a lid/plate or other separate layer, which may be coupled to one or more adjacent waveguides rather than incorporating the waveguides into the same, unitary structure defining the antenna slots, as is the case with preferred embodiments disclosed herein.

RX section 115 of assembly 100 comprises four elongated antenna slots 120A, each of which is spaced apart from one or more adjacent slots 120A and, as discussed in greater detail below, has various other functional features spaced in between and/or otherwise throughout section 115. More particularly, a series of antenna grooves 130A are formed adjacent to the aforementioned antenna slots 120A of RX section 115.

The spacing between one or more of the various slots, grooves, or other features of the assembly 100 may be selected to improve functionality or facilitate a desired outcome for a particular use. For example, in the embodiment of FIG. 1, the distance between the RX antenna slot 120A adjacent to the perimeter of the assembly (on the left side of section 115 in the figure) may be spaced apart in a horizontal direction from its adjacent RX antenna slot by a distance corresponding to about 1.5 wavelengths of the electromagnetic radiation used in the antenna module. Thus, for applications using the automotive RADAR band at 76 to 81 GHz, this distance D0 may be between about 5.5 mm and about 5.9 mm.

Alternatively, distance D0 may be about 2 wavelengths of the electromagnetic radiation used in the antenna module. Thus, for applications using the automotive RADAR band at 76 to 81 GHz, this distance D0 may be between about 7.4 mm and about 8.0 mm.

Similarly, distance D1, which is the distance between the second and third RX antenna slots 120A, may, in some embodiments, be about 1 wavelength of the electromagnetic radiation used in the antenna module. Thus, for applications using the automotive RADAR band at 76 to 81 GHz, this distance D1 may be between about 3.7 mm and about 4 mm.

Distance D2 may, in some embodiments, be the same or similar to distance D0. Thus, in some embodiments, distance D2 may be about 1.5 wavelengths of the electromagnetic radiation used in the antenna module. Thus, for applications using the automotive RADAR band at 76 to 81 GHz, distance D2 may also be between about 5.5 mm and about 5.9 mm. As those of ordinary skill in the art will appreciate, however, these distances, along with all other distances disclosed herein, may vary as desired according to the specific application and desired outcome.

Antenna grooves 130A extend parallel, or in other embodiments at least substantially parallel, to antenna slots 120A. Moreover, unlike antenna slots 120A, which extend all the way through the structure of assembly 100 in which they are formed, such as a waveguide and/or antenna block or a layer of assembly 100, antenna grooves 130A extend into this structure without extending entirely through the structure (hence, the use of the term "groove" rather than "slot"). However, as previously mentioned, in some embodiments, structures intended to alter one or more aspects of an electromagnetic signal in an antenna slot may also comprise a slot. Such slots are referred to herein as "auxiliary slots."

Each antenna groove 130A also at least substantially mimics one or more (in the depicted embodiment, all) of the antenna slots 120A in length. As discussed in connection with other embodiments below, some antenna grooves are configured to mimic, or at least substantially mimic, one or more of the antenna slots 120A in both length and width. However, antenna grooves 130A of assembly 100 only mimic or resemble antenna slots 120A in length and are primarily configured to isolate the antenna grooves 130A from their surroundings, which may be useful in reducing bearing errors and narrowing the antenna pattern to reduce the field of view. Thus, antenna grooves 130A may be referred to herein as "antenna isolation grooves."

TX section 117 of assembly 100 comprises antenna slots 120B at opposing ends of the section 117 and further comprises a high-gain, squinted antenna 140 in between these opposing antenna slots 120B. Antenna 140 comprises an array of radiating slots 142 formed in a portion, such as a top layer, thereof. In the depicted embodiment, this array is formed into parallel columns that are offset from one another. Thus, a first column, such as the column shown on the left side of antenna 140, may comprise slots 142 that are positioned adjacent to spaces in between adjacent slots 142 in the adjacent column. The pattern of alternative/offset columns may repeat throughout the array such that, as shown in FIG. 1, slots 142 from the array in a column with an intermediate column therebetween may be aligned with the slots from the column, and so on. However, it is contemplated that, in other embodiments, the array of slots 142 may comprise columns and/or rows that are aligned with one another rather than offset with respect to adjacent columns and/or rows.

Although not shown in FIG. 1, it is contemplated that antenna 140 may comprise various waveguides or other features that may be present below the layer shown in FIG. 1. For example, each of the antenna slots may comprise an associated waveguide, which may comprise a "trench-like" waveguide defined by solid opposing sidewalls or, as discussed later, may comprise a waveguide formed by rows of adjacent posts forming a waveguide therebetween. In embodiments in which waveguides are formed by rows of posts, two rows of posts may form a waveguide therebetween or, alternatively, multiple rows of adjacent posts may be positioned on either side of the waveguide defined therebetween.

Similarly, with respect to antenna 140, a waveguide may be formed thereunder to feed the array of radiating slots 142. In some embodiments, this waveguide may comprise a self-contained, feed waveguide, which may be formed within a tunnel formed within a body or other portion of the antenna 140. A series of feed slots may also be formed along this waveguide to allow electromagnetic energy to be introduced from the waveguide into another waveguide, such as a parallel plate waveguide formed between upper surface of the antenna 140 and a lower surface of, for example, a cover, which may comprise the layer visible in FIG. 1. These feed slots may be arranged in a straight line and preferably extend along the tunnel waveguide at a position near, but not precisely along, the center of the waveguide.

In addition, in some embodiments, an array of protrusions may be formed within the underlying structure of antenna 140. In some such embodiments, like slots 142, these protrusions may be formed in an array having offset columns. In preferred embodiments, these protrusions may also have one or more parameters that correlate with slots 142. For example, the protrusions may have the same shape, a substantially identical shape, or at least a similar shape as slots 142. Preferably, however, one or both of slots 142 and the underlying protrusion may be elongated in one direction to provide an identifiable elongated axis. Thus, it may be preferred to avoid circular shapes, for example.

It may also be preferred that the protrusions have the same or a similar size with respect to the slots 142. Thus, although it may be preferred that they have the same, or at least substantially the same size (within about ±15% of one or more dimensions such as length, width, and/or area/footprint). However, it is contemplated that, in some embodiments, one or more of the length, width, and area of the protrusions may be between about 50% and about 150% of the corresponding length, width, and/or area of the slots 142.

As another preferred matching parameter, preferably, most or all of protrusions are positioned directly, or at least substantially directly, under a corresponding slot 142. However, it is contemplated that, in some embodiments, the positioning of each protrusion may be shifted slightly (preferably less than about 0.5 mm in automotive applications; for other applications, such as applications using radiation at a frequency of around 30 GHz, for example, the shifting may be 1 mm or more) relative to one or more (in some cases, each) corresponding slot 142. In addition, although it may be preferred to have an equal number of protrusions as slots 142, it is contemplated that some protrusions may be omitted. Moreover, in some embodiments, protrusions may be omitted altogether. However, when present, preferably sufficient numbers of protrusions are formed such that there is an equal number of columns and/or rows of protrusions as columns and/or rows of slots 142.

Preferably, when present, protrusions are between about 0.1 mm and about 0.4 mm in height for automotive applications operating in the frequency range of 76-81 GHz. However, as those of ordinary skill in the art will appreciate, the height of the protrusions may vary in accordance with the frequency of the electromagnetic radiation being used. The height used may also vary depending upon the desired use of the antenna, since the height of the protrusions may be used as a parameter to control the amplitude and/or phase of the excitation of the radiating slots 142 and/or may be used to direct a squint of a main lobe of the antenna, the shape of the main lobe, and/or the level of side lobes and/or the grating lobe. The preferred sizes of the protrusions may be identified using 3-D simulation software, such as HFSS, and may be selected among results of various simulations or using an optimization procedure.

The desired sizes of the radiating slots 142 of squinted antenna 140 may be found using, for example, 3-D simulation software. Although the locations of the slots 142 are preferably synchronized with the locations of the protrusions such that they are aligned with one another, the slot-to-slot distance (as well as the protrusion-to-protrusion distance) is preferably constant (although may be non-uniform in other contemplated embodiments, which may provide for another degree of freedom to shape the desired radiation pattern) and may vary from about one-fourth to about a full wavelength of the parallel-plate waveguide wavelength. This distance may effectively impact the squint angle and may therefore be a prime design parameter determining the squint value. The slot-to-slot distance (as well as the protrusion-to-protrusion distance) in a perpendicular direction is also preferably constant and may be, for example, about a half wavelength of the wave propagating in the internal, tunnel waveguide mentioned above.

In the depicted embodiments, the number of feed slots from the tunnel waveguide is equal to the number of columns of protrusions and/or the number of columns of radiating slots 142. However, as will be apparent from a review of all embodiments disclosed herein, this need not be the case for all contemplated embodiments. In addition, the size/footprint of feed slots may be identical, or at least substantially identical, to that of the protrusions and/or radiating slots 142, but this need not always be the case either.

For some applications, it may also be preferred that the tunnel/internal waveguide is positioned adjacent to a peripheral edge of antenna 140 rather than at or near the center. Although there are embodiments contemplated in which this internal waveguide is not positioned adjacent to an outer edge of antenna 140, it is thought that some of the parameters of assembly 100 may need to be adjusted if this modification is made.

It may also be preferred to have all of the protrusions and/or radiating slots 142 positioned on one side of the feed slots from the internal/tunnel waveguide. However, it is contemplated that, in some embodiments, one or more protrusions and/or radiating slots 142 may instead be positioned on the opposite side of these feed slots and/or the internal/tunnel waveguide. However, it is preferably that at least most of the radiating slots 142 and, when present, protrusions, are positioned on one side of the internal/tunnel waveguide and/or feed slots, which may be facilitated by placement of the internal/tunnel waveguide adjacent to a peripheral edge, as previously mentioned. Thus, in preferred embodiments, at least 90% of the radiating slots 142 and/or protrusions are positioned on just one side of the internal and/or tunnel waveguide and/or feed slots.

Further details regarding squinted antenna assemblies, which may be used to create various alternative embodiments of antenna 140, can be found in U.S. patent application Ser. No. 17/206,599 titled PARALLEL PLATE SLOT ARRAY ANTENNA WITH DEFINED BEAM SQUINT, which was filed on Mar. 19, 2021, and which is incorporated herein by reference in its entirety.

Various grooves, all of which may be considered isolation grooves in the depicted embodiment, are also shown formed along TX section 117. Thus, a single groove 130B is positioned on opposing ends of section 117. In addition, another isolation single groove 130B is positioned immediately adjacent to antenna 140 on opposing sides thereof. Thus, an isolation groove 130B is positioned on either side of each TX antenna slot 120B, and on either side of high-gain, squinted antenna 140. Additional horizontal isolation grooves 132 are formed at each opposing end of each antenna slot 120B that extend perpendicular, or at least substantially perpendicular in alternative embodiments, to antenna slots 120B.

Outermost TX antenna slots 120B are, in preferred embodiments, separated by about 5 wavelengths of the electromagnetic radiation used in the antenna module. Thus, for applications using the automotive RADAR band at 76 to 81 GHz, distance D4 may be between about 18.5 mm and about 19.7 mm.

Preferably, the two outermost TX antenna slots 120B are also shifted in the vertical direction. In some embodiments, this shifting may be at a distance D3 that is between about 0.5 and about 1.5 wavelengths of the electromagnetic radiation used in the antenna module. Thus, for applications using the automotive RADAR band at 76 to 81 GHz, distance D3 may, in embodiments in which D3 is 1.5 wavelengths, be between about 5.5 mm and about 5.9 mm.

By providing two distinct types of TX antennae, the possibility of providing for two distinct TX modes in an associated sensor assembly may be provided. Thus, for example, high-gain, squinted antenna 140 may be used for long-range detection, which may be particularly useful for positioning in the front region of a vehicle. The particular squint may be selected by altering various parameters in order to direct the beam in a desired direction. A second mode may be associated with use of the wide antenna slots 120B on either side of the squinted-beam antenna 140.

In some embodiments, multiple isolation grooves 130A may be positioned between some or, in other contemplated embodiments, all adjacent antenna slots 120A. Thus, in the depicted embodiment, a single isolation groove 130A may be positioned at a first end of RX section 115 and a pair of isolation grooves 130A may be positioned at the opposite end adjacent to the TX section 117, which may reduce coupling between the TX section 117 and the RX section 115, which can improve the signal-to-noise ratio and/or improve range. In addition, a single isolation groove 130A is positioned between the two center antenna slots 120A, but multiple isolation grooves 130A are positioned between these antenna slots 120A and the outermost antenna slots 120 of RX section 115. This may be helpful in reducing overall coupling/interaction between adjacent antennae, which can, for example, improve bearing estimations.

In some embodiments, the isolation grooves 130A and/or 130B may be between about 0.4 mm and about 1.0 mm wide and may be between about 0.7 mm and about 1.0 mm deep. In a particular, preferred embodiment, the isolation grooves may be about 0.5 mm wide and about 0.75 mm deep.

Of course, as those of ordinary skill in the art will appreciate, a wide variety of alternative options are possible. For example, multiple isolation grooves and/or auxiliary slots may be positioned between each adjacent antenna and/or antenna slot if desired. Similarly, different numbers of isolation grooves and/or antenna slots may be used as desired. These specifications may be determined by the groove width and spacing and/or by the space available between antennae.

Figure 2:
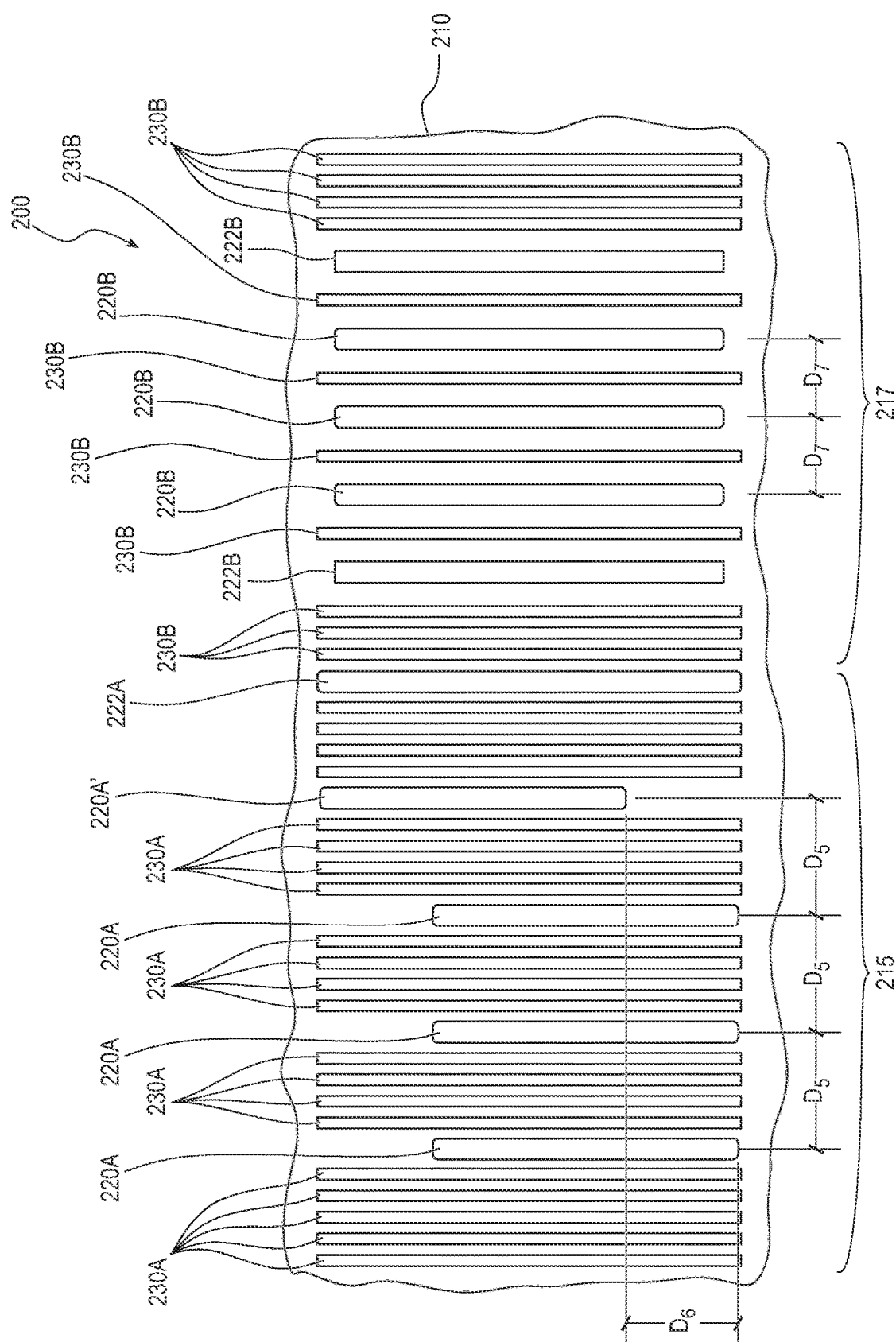
FIG. 2 is a plan view of an antenna module according to other embodiments.

FIG. 2 depicts an alternative embodiment of a waveguide/antenna/sensor assembly 200. Assembly 200 comprises various antenna slots and grooves, as previously mentioned. In addition, assembly 200 further comprises one or more antenna grooves, wherein each of the one or more antenna grooves is positioned adjacent to at least one of the one or more antenna slots, wherein each of the one or more antenna grooves that are designed to resemble one or more of the antenna slots but without extending all the way through the structure in which they are formed similar to the antenna slots.

More particularly, assembly 200 comprises a body 210, which may comprise a casting, layer, or the like. Assembly 200 further comprises an RX section 215 and a TX section 217. RX section 215 comprises four antenna slots 220A. Each of the four antenna slots 220A has essentially the same shape—i.e., the same length and width. However, three of the antenna slots 220A are aligned with one another—i.e., they begin and end at the same points along the structure into which they are formed—and the last of the antenna slots (220A') is shifted vertically. Vertically shifted antennae may be used to calculate elevation bearing.

Each of the adjacent RX antenna slots 220A may be separated from one another by a distance of D5, which may, for example, be a distance that is about 1.5 wavelengths of the electromagnetic radiation used in the antenna module. Thus, for applications using the automotive RADAR band at 76 to 81 GHz, distance D5 may be between about 5.5 mm and about 5.9 mm.

The vertical position between RX antenna slot 220A' and its adjacent antenna slot 220A may, in some embodiments, also be shifted by a particular distance (distance D6) in some embodiments. For example, D6 may be between about 0.5 and about 1.5 wavelengths of the electromagnetic radiation used in the antenna module. Thus, for applications using the automotive RADAR band at 76 to 81 GHz and in which D6 is 1.5 wavelengths, distance D6 may be between about 5.5 mm and about 5.9 mm.

An array of isolation grooves 230A is positioned adjacent to each antenna slot 220A and in between each pair of adjacent antenna slots 220A. In the depicted embodiment, five isolation grooves 230A are positioned on the outer edge of RX section 215, after which four isolation grooves 230A are positioned in between each pair of adjacent antenna slots 220A thereafter. As those of ordinary skill in the art will appreciate, the number of isolation grooves 230A used may vary according to the desired results but, as shown in the depicted embodiment, a larger number of isolation grooves 230A may be used in portions of the assembly 200 that delimit or are adjacent to boundaries, such as exterior boundaries of the assembly 200 and/or boundaries between different functional portions of the assembly 200.

It is also worth noting that the isolation grooves 230A are substantially longer and thinner than the antenna slots 220A. Moreover, the first three (from the perspective of FIG. 2 starting at the left side of the figure) antenna slots 220A are aligned with the lower ends of the adjacent array(s) of isolation grooves 230A and the fourth antenna slot 220A' is aligned with the upper end of the adjacent arrays of isolation grooves 230A.

Grooves 230A arranged into relatively dense arrays, as shown in FIG. 2, may be useful to help isolate the adjacent antennae from one another and/or improve bearing estimation for both azimuth and elevation. These grooves may also be configured to reduce ripple in azimuth patterns. In some embodiments, isolation grooves 230A may be between about 0.4 mm and about 1.0 mm wide and may be between about 0.7 mm and about 1.0 mm deep. In a particular, preferred embodiment, the isolation grooves may be about 0.5 mm wide and about 0.75 mm deep.

Although from the plan view of FIG. 2, groove 222A appears similar to antenna slots 220A and 220A', it should be understood that, unlike these antenna slots 220A and 220A', groove 222A does not form an opening that extends all the way through the structure/layer into which each of these features is formed. Thus, this groove 222A should be considered to resemble or mimic the antenna slots 220A and 220A' without actually comprising a slot. Groove 222A may therefore be considered a "fake" or "parasitic" slot, which may, in some cases along with the aforementioned isolation grooves, be used to better match the shifted antenna slot 220A' to its adjacent antenna slot 220A. The term "parasitic" antenna may be used to indicate the positioning of these grooves next to functional antennas, such as at the end of an antenna array, so that the last (and first) antenna on the array "sees" similar surroundings relative to the antenna in the middle of the array. In this manner, the edge antennas may be able to achieve similar performance with the rest of the antennas in the array.

However, again, it should be understood that, in alternative embodiments, groove 222A may instead extend all of the way through the structure/layer into which it is formed and may therefore be considered an "auxiliary slot" that may have the same or a similar purpose.

In addition, comparing detections received from the shifted antenna slot 220A' to detections from other antenna slots 220A, such as the antenna slot 220A adjacent to shifted antenna slot 220A', may be used to estimate elevation bearing. For example, the better matched shifted antenna slot 220A' is to one or more of the adjacent antenna slots 220A, the better the elevation bearing estimate will be.

As previously mentioned, assembly 200 further comprises a TX section 217. TX section 217 also comprises a plurality of antenna slots 220B, a plurality of grooves 230B, and a plurality of "fake" or mimicking grooves 222B, which, as mentioned, may be configured to match or at least substantially resemble the antenna slots 220B, preferably in both length and width but most preferably in at least width, but without extending all the way through the structure into which they are formed, unlike the antenna slots 220B.

In the depicted embodiment, there are three TX antenna slots 220B, each of which has a pair of adjacent grooves 230B adjacent thereto, one on either side. In addition, a single mimicking groove 222B is positioned at each opposing end of the outermost, single grooves 230B previously mentioned. These grooves 222B mimic/match the antenna slots 220B, again, without extending all the way through the structure into which they are formed. Thus, it may be desirable to include at least one peripheral mimicking groove 222B on or adjacent to each opposing end of the outermost antenna slots 220B of TX section 217 and/or of TX section 217 itself. It should be understood that more than one isolation groove may be positioned adjacent and/or on either side of each antenna slots 220B, if desired.

In addition, an array of additional grooves 230B is positioned on the opposing outermost edges of the opposing mimicking grooves 222B. The array of grooves 230B to the left, which is in between TX section 217 and RX section 215, may be considered a part of either section. Four grooves 230B are positioned on the right side of TX section 217, thereby delineating the outermost edge of this functional section, whereas three grooves 230B are positioned on the left side in between TX section 217 and RX section 215, thereby again either being considered an intermediate section or a functional part of either of these sections.

In some embodiments, some or all of TX grooves 230B may be less deep than some or all of the RX isolation grooves. These TX grooves may be used to manipulate the interaction between adjacent slots and shape the azimuth pattern. Their depth may be adjusted to adjust the interaction between antennas in a way that optimizes the pattern. They may function as delay elements or additional scatterers. However, in some embodiments, one or more of the TX grooves 230B near the edge (the right side of FIG. 2) may be deeper than the other TX grooves 230B (in some cases the same depth as the RX grooves 230A). Thus, in a specific example, the rightmost three TX grooves 230B may be deeper than the remaining TX grooves 230B and/or may be the same depth as the RX grooves 230A.

Although not visible in FIG. 2, in some embodiments, one or more of the various grooves 230B (and/or grooves 230A) may have a different depth from one or more of the other isolation grooves. For example, in some embodiments, shallower grooves may be interspersed throughout assembly 200, or any of the other embodiments depicted and/or described herein. In some such embodiments, the shallower grooves may be primarily, or exclusively, found in the TX section 217.

For example, in a particular contemplated embodiment, each of the single grooves 230B immediately adjacent to an antenna slot 220B may be shallower than some, most, or all of the other isolation grooves. In addition, one (or, in other contemplated embodiments, a plurality) of grooves 230B of an array on one or both outer ends of TX section 217 may be shallower than the other grooves 230B in such arrays and/or shallower than the isolation grooves 230A in RX section 215. Preferably, the shallower isolation grooves 230A in these arrays consist of only the innermost isolation grooves 230A. For example, in the embodiment of FIG. 2, only the single, innermost isolation groove 230A in each of the outermost arrays adjacent and outside of the fake/slot mimicking grooves 222B may be shallower than the others. These shallower grooves may be, in preferred embodiments, between about 20% and about 60% less deep than the other grooves. Thus, in an embodiment in which the deeper grooves are about 0.75 mm deep, the shallower grooves may be about 0.5 mm deep.

Other potentially important distances are shown in FIG. 2 on the TX section 217. For example, distance D7 between adjacent TX antenna slots 220B may, in some embodiments, about 1 wavelength of the electromagnetic radiation used in the antenna module. Thus, for applications using the automotive RADAR band at 76 to 81 GHz, distance D7 may be between about 3.7 mm and about 4 mm.

The distance between the outermost TX antenna slots 220B and their respective, adjacent, slot-mimicking grooves 222B, may be the same as distance D7 (about 1 wavelength of the electromagnetic radiation used in the antenna module). Thus, for applications using the automotive RADAR band at 76 to 81 GHz, this distance may also be between about 3.7 mm and about 4 mm. Alternatively, however, distance D7 may be closer to 1.5 wavelengths. Thus, D7 may, in some embodiments, be between about 1 and about 1.5 wavelengths of the electromagnetic radiation used in the antenna module.

Figure 3:
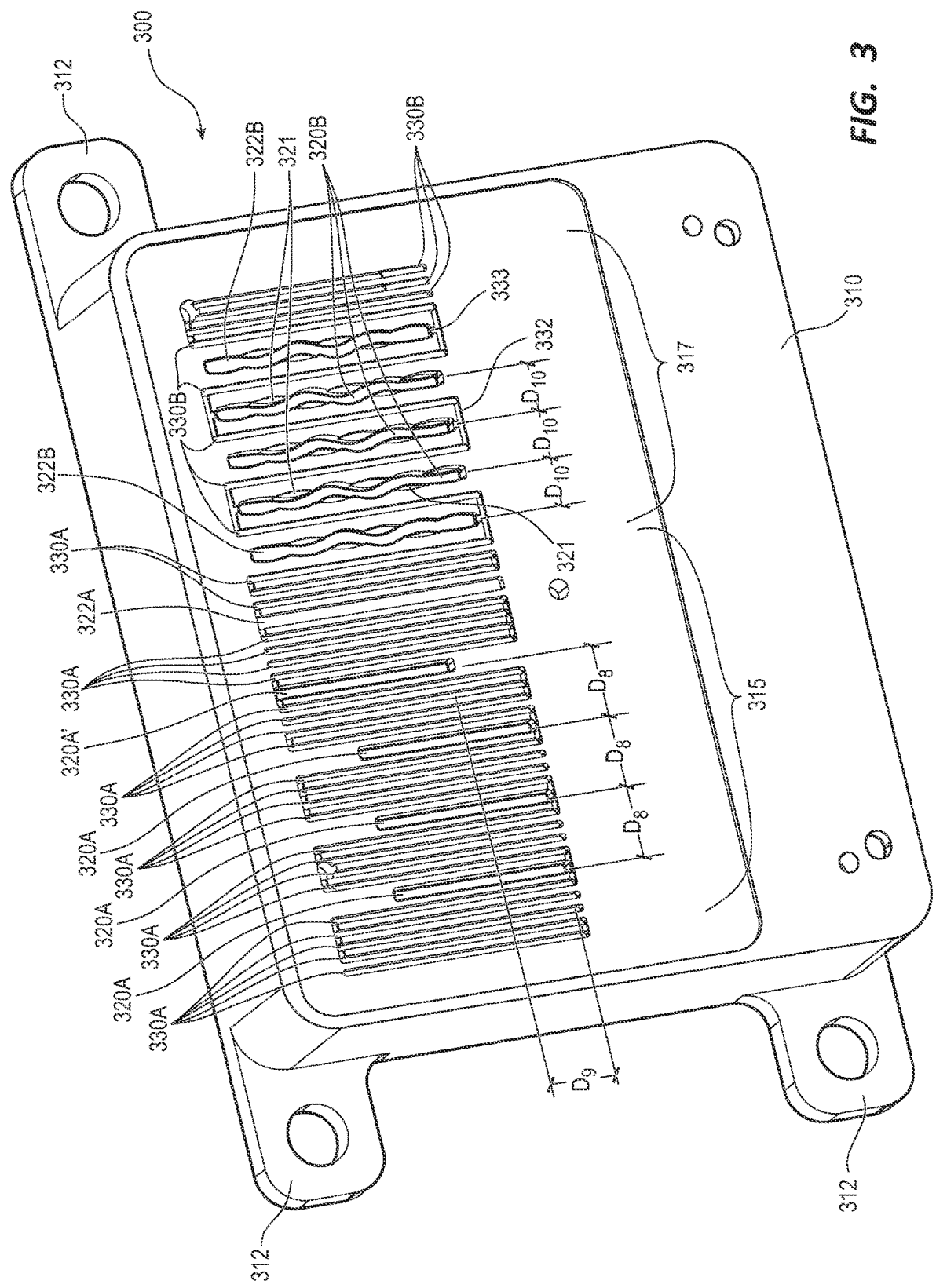
FIG. 3 is a perspective view of an antenna module according to still other embodiments.

FIG. 3 depicts yet another embodiment of a waveguide/antenna/sensor assembly 300. Assembly 300 comprises various antenna slots and grooves, as previously mentioned. In addition, assembly 300 further comprises one or more antenna grooves, wherein each of the one or more antenna grooves is positioned adjacent to at least one of the one or more antenna slots, wherein each of the one or more antenna grooves (or, in alternative embodiments, auxiliary slots) that are designed to resemble one or more of the antenna slots but without extending all the way through the structure in which they are formed similar to the antenna slots.

More particularly, assembly 300 comprises a body 310, which may comprise a casting, layer, or the like, from which mounting tabs 312 protrude, which may allow for mounting of assembly 300 to a suitable location on a vehicle, for example.

Assembly 300 further comprises an RX section 315 and a TX section 317. RX section 315 may be similar or identical to RX section 215 of assembly 200. Thus, RX section 315 comprises four antenna slots 320A, each of which may have essentially the same shape—i.e., the same length and width. However, three of the antenna slots 320A are aligned with one another—i.e., they begin and end at the same points along the structure into which they are formed—and the last of the antenna slots (320A') is shifted vertically.

An array of isolation grooves 330A is positioned adjacent to each antenna slot 320A and in between each pair of adjacent antenna slots 320A. In the depicted embodiment, five isolation grooves 330A are positioned on the outer edge of RX section 315 on the left side of the figure, after which four isolation grooves 330A are positioned in between each pair of adjacent antenna slots 320A thereafter. As those of ordinary skill in the art will appreciate, the number of isolation grooves 330A used may vary according to the desired results but, as shown in the depicted embodiment, a larger number of isolation grooves 330A may be used in portions of the assembly 300 that delimit or are adjacent to boundaries, such as exterior boundaries of the assembly 300 and/or boundaries between different functional portions of the assembly 300.

It is also worth noting that the isolation grooves 330A are longer and thinner than the antenna slots 320A. Moreover, the first three (from the perspective of FIG. 3 starting at the left side of the figure) antenna slots 320A are aligned with the lower ends of the adjacent array(s) of isolation grooves 330A and the fourth antenna slot 320A' is aligned with the upper end of the adjacent arrays of isolation grooves 330A.

In addition, one or more of the isolation grooves 330A may be interconnected with one another and/or interconnected with antenna slots 320 along their respective ends, as shown in FIG. 3, if desired.

Grooves 330A arranged into relatively dense arrays, as shown in FIG. 3, may be useful to help isolate the adjacent antennae from one another and/or improve bearing estimation for both azimuth and elevation. These grooves may also be configured to reduce ripple in azimuth patterns, as discussed above. In some embodiments, isolation grooves 330A may be between about 0.4 mm and about 1.0 mm wide and may be between about 0.7 mm and about 1.0 mm deep. In a particular, preferred embodiment, the isolation grooves 330A may be about 0.5 mm wide and about 0.75 mm deep.

Although from the perspective view of FIG. 3, groove 322A appears similar to antenna slots 320A and 320A', it should be understood that, unlike these antenna slots 320A/320A', groove 322A does not form an opening that extends all the way through the structure/layer into which each of these features is formed. Thus, this groove 322A should be considered to resemble or mimic the antenna slots 320A and 320A' without actually comprising a slot. Groove 322A may therefore be considered a "fake slot" or an "antenna slot mimicking groove" which may, in some cases along with the aforementioned isolation grooves, be used to better match the shifted antenna slot 320A' to its adjacent antenna slot 320A. Again, alternatively, one or more of the "fake slots" or an "antenna slot mimicking grooves" may be replaced with one or more auxiliary slots.

In addition, comparing detections received from the shifted antenna slot 320A' to detections from other antenna slots 320A, such as the antenna slot 320A adjacent to shifted antenna slot 320A', can be used to estimate elevation bearing. For example, the better matched shifted antenna slot 320A' is to one or more of the adjacent antenna slots 320A, the better the elevation bearing estimate will be.

The distances between adjacent RX antenna slots—D8—may be the same as that of assembly 200. Thus, D8 may be about 1.5 wavelengths of the electromagnetic radiation used in the antenna module. Thus, for applications using the automotive RADAR band at 76 to 81 GHz, distance D8 may be between about 5.5 mm and about 5.9 mm.

Similarly, distance D9, which is the vertical shift between RX antenna slot 320A' and its adjacent RX antenna slot 320A, may be the same as that of assembly 200. Thus, D9 may be about 1.5 wavelengths of the electromagnetic radiation used in the antenna module. Thus, for applications using the automotive RADAR band at 76 to 81 GHz, distance D9 may also be between about 5.5 mm and about 5.9 mm. Alternatively, D9 may be about 1 wavelength. Thus, in some embodiments, D9 may be between about 1 and about 1.5 wavelengths of the electromagnetic radiation used in the antenna module.

Assembly 300 further comprises a TX section 317. TX section 317 also comprises a plurality of antenna slots 320B, a plurality of grooves 330B, and a pair of "fake" or mimicking grooves 322B, which, as mentioned, may be configured to match or at least substantially resemble the antenna slots 320B, preferably in both length and width but most preferably in at least width, but without extending all the way through the structure into which they are formed, unlike the antenna slots 320B.

In the depicted embodiment, there are three TX antenna slots 320B, each of which has a pair of adjacent grooves 330B adjacent thereto, one on either side. In addition, a single mimicking groove 322B is positioned at each opposing end of the outermost, single isolation grooves 330B previously mentioned. These grooves 322B mimic/match the antenna slots 320B, again, without extending all the way through the structure into which they are formed. It should be understood that more than one isolation groove may be positioned adjacent and/or on either side of each antenna slots 320B, if desired.

Unlike the antenna slots and fake/antenna slot mimicking grooves previously mentioned, however, antenna slots 320B are curved or "wavy." More particularly, slots 320B and, because they are intended to mimic slots 320B, grooves 322B as well, oscillate back and forth between opposing sides of an elongated axis.

The spacing between adjacent TX antenna slots 320B may be similar to the embodiments previously discussed. Thus, in some embodiments, distances D10 may be about 1 wavelength of the electromagnetic radiation used in the antenna module. Thus, for applications using the automotive RADAR band at 76 to 81 GHz, distance D10 may also be between about 3.7 mm and about 4 mm.

It is also contemplated that additional RX and/or TX antenna slots may be used, for in connection with assembly 300 and any of the other assemblies disclosed herein. Preferably, these additional slots may have the same spacing on their respective functional side of the assembly. Thus, for example, in a specific alternative embodiment of assembly 300, an additional TX antenna slot may be added, which antenna slot may have the same spacing as one or more of the other adjacent TX antenna slots—i.e., about 1.5 wavelengths of the electromagnetic radiation being used, for example.

Figure 4:
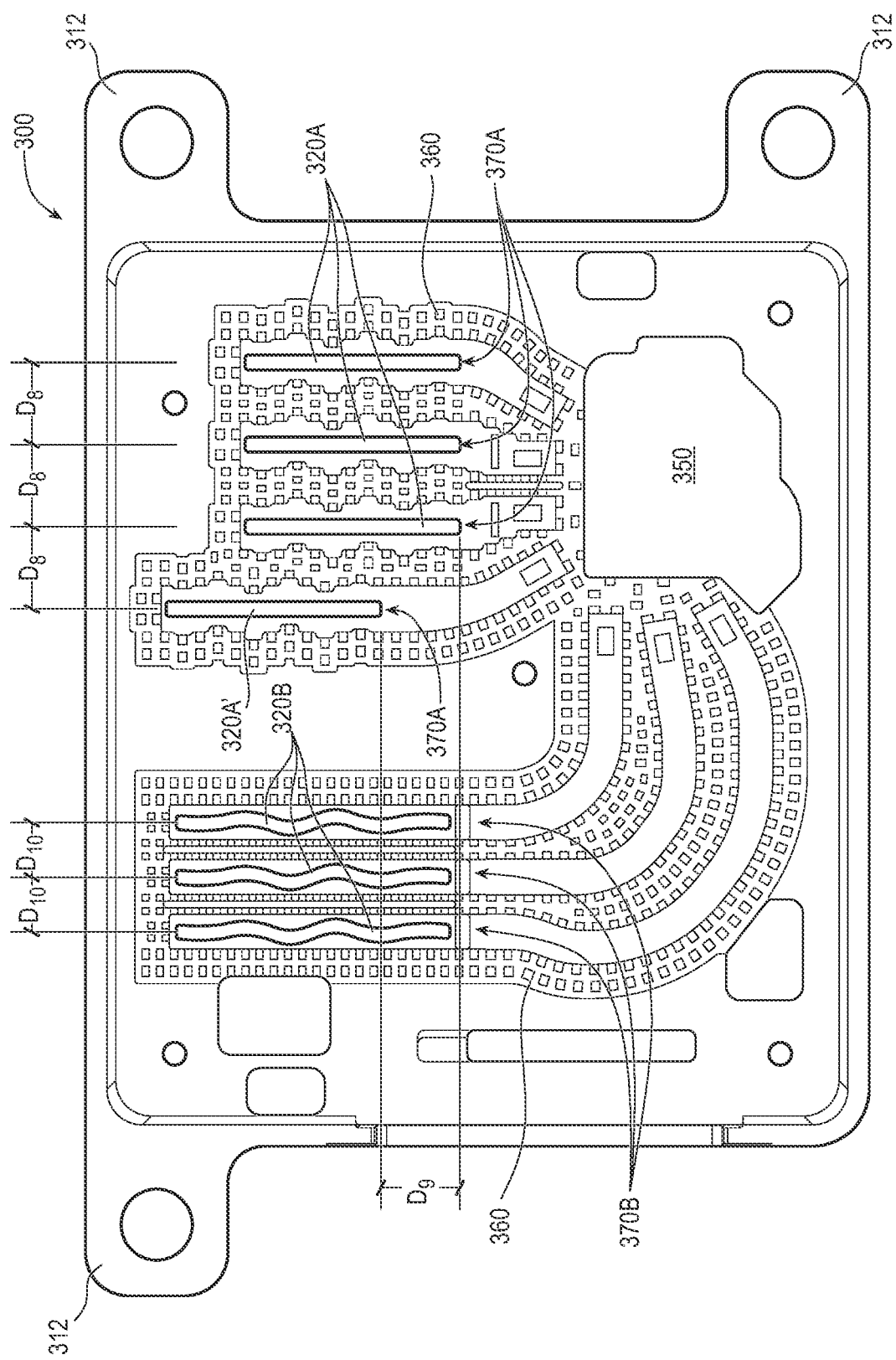
FIG. 4 is a plan view of the antenna module of FIG. 3 showing the side opposite from that shown in FIG. 3.

As shown in FIG. 4, which depicts the opposite side of assembly 300, slots 320B are also positioned directly above respective waveguide grooves 370B. Any of the mimicking grooves, such as grooves 322B, may be replaced with auxiliary slots instead that may similarly mimic the antenna slots in one or more aspects but, unlike grooves 322B, extend entirely through the structure into which they are formed.

Similar waveguide grooves 370A are formed in the depicted embodiment by opposing rows of posts 360 on the RX section 315 of the assembly 300 with antenna slots 320A centered therein.

It is contemplated that these waveguides may be formed in the same block/structure as the slots 320B or may be formed in separate structures, such as layers, in alternative embodiments. In the depicted embodiment, waveguide grooves 370B are formed between a plurality of rows of posts 360. However, in alternative embodiments, waveguides may be formed as "trench"-like waveguides defined by forming grooves defined by continuous opposing walls.

In the depicted embodiment, a single waveguide groove 370B is defined by two or more opposing rows of posts 360 on each side of each waveguide groove 370B. However, alternative embodiments are contemplated in which a single row of posts 360 on either side of each waveguide groove is used, or others in which more rows of posts 360 that are depicted in FIG. 4 are used.

In addition, although this need not be the case for other embodiments, in the depicted embodiment, each antenna slot 320B is centered, or at least substantially centered, with respect to adjacent groove 370B and oscillates towards the opposing walls defined by posts 360 in an intermittent manner.

Each antenna slot 320B and, due to the desire to mimic these antenna slots 320B, each groove 322B, may, in some embodiments, further comprise a phase-compensating feature. In the depicted embodiment, this is accomplished by applying one or more angled and/or tapered sections, such as tapered grooves or cutouts, along the slots. Thus, the depicted embodiment illustrates a tapered and/or angled section/surface 321 that is formed along both opposing sidewalls defining each antenna slot 320B, along with each slot-mimicking groove 322B, at respective points of maxima for the oscillating pattern of the respective slot/groove.

These tapering sections 321 may comprise a stepped taper or ledge, or may comprise a smoothly transitioning taper. In other words, a ledge may be formed at the starting point of the taper and therefore, rather than a smooth taper between the outer surface of the structure defining the slot/groove and the starting point of section 321, the transition of tapering section 321 may be immediate from the starting point, which is at a ledge of section 321 to the outer surface of the structure forming the slot/groove.

In some embodiments, all of the peaks/maxima of the oscillating pattern of slots 320B and/or grooves 322B may comprise a phase-compensating feature, such as a tapering section 321. Alternatively, in some embodiments, only a subset of the peaks/maxima defined by slots 320B and/or grooves 322B may comprise such a feature.

In addition, slots 320B and/or grooves 322B may intermittently oscillate on opposite sides of its respective elongated axis and/or adjacent waveguide (see FIG. 4) along at least a portion thereof. In some such embodiments, each of at least a subset of the plurality of the tapering surfaces/sections 321 may be spaced apart in a manner that coincides with the intermittent oscillation of the slots 320B and/or grooves 322B. In some such embodiments, all of the tapering surfaces/sections 321 may be spaced apart in a manner that coincides with the intermittent oscillation of the slots 320B and/or grooves 322B.

It should be understood, however, that the stepped taper of assembly 300 is but an example for purposes of illustration and that a wide variety of alternative embodiments are contemplated. For example, although only a single step is used in the tapered section 321 of assembly 300, any number of steps may be used in between the one step shown in this embodiment and an effectively infinite number of steps involved in a smooth taper.

Each of the tapering sections 321 of assembly 300 may comprise a stepped taper extending between a first edge of the ledge formed by tapering section 321, which first edge may be positioned in between the external surface of the structure forming slots 320B and/or grooves 322B and the internal surface of this structure, and a second edge of a concavely curved surface (in some cases, a semi-circular concavely curved surface), the second edge extending along the external surface of the aforementioned structure. Again, any number of intermediate steps may be used as desired.

In preferred embodiments, these sections/surfaces 321 are positioned so as to alternate and be staggered along the opposing slot sidewalls such that each section 321 is positioned at a particular point along the axis of along only one sidewall of each respective slot 320B and/or groove 322B. In addition, even more preferably, each section 321 is formed along one of the peaks of each oscillating respective slot 320B and/or groove 322B. Thus, for example, if the slot defines, or at least substantially defines, a sine wave, each of the sections 321 is preferably formed along one of the peaks of the sine wave extending towards the axial center of the slot 320B and/or accompanying waveguide 370B.

In some embodiments, all of the aforementioned peaks may comprise a phase-compensating feature, such as a tapering section 321. Alternatively, only a subset of the peaks defined by each respective slot 320B and/or groove 322B may comprise such a feature.

In some embodiments, each respective slot 320B and/or groove 322B may intermittently oscillate on opposite sides of the elongated axis of each respective slot 320B, groove 322B, and/or adjacent waveguide 370B along at least a portion thereof. In some such embodiments, each of at least a subset of the plurality of the tapering surfaces/sections 321 may be spaced apart in a manner that coincides with the intermittent oscillation of each respective slot 320B and/or groove 322B. In some such embodiments, all of the tapering surfaces/sections 321 may be spaced apart in a manner that coincides with the intermittent oscillation of each respective slot 320B and/or groove 322B.

Thus, for example, in some embodiments, each of the plurality of tapering sections surfaces 321 may comprise a first set of tapering surfaces on a first side of each respective slot 320B and/or groove 322B and a second set of tapering surfaces 321 on a second side of each respective slot 320B and/or groove 322B opposite the first side. Preferably, the tapering surfaces/sections 321 alternate such that each tapering surface of first set of tapering surfaces is positioned adjacent to one or more tapering surfaces of the second set of tapering surfaces along the axis of each respective slot 320B and/or groove 322B and each tapering surface of the second set of tapering surfaces is positioned adjacent to one or more tapering surfaces of the first set of tapering surfaces along the axis, again, preferably alternating back and forth across each respective slot 320B and/or groove 322B.

Each of the plurality of tapering surfaces/sections 321 may comprise a curved, tapering surface in some embodiments. Indeed, in the depicted embodiment, each of the tapering surfaces/sections 321 is defined, at least in part, by a semi-circular cutout, which may be formed at the exterior surface of each respective slot 320B and/or groove 322B, as a concave region from the convex region of the curve defined by each respective slot 320B and/or groove 322B, and then may taper down to a corner, edge, or starting point of the taper. Thus, preferably, the tapers of sections 321 do not extend all the way between opposing surfaces of the structure of assembly 300 defining slots 320B, but rather start at a point between the opposing surfaces of this structure and extend to the upper/outer portion of slots 320B on the side opposite the aforementioned waveguides 370B.

However, in embodiments in which one or more of the tapering sections 321 has a starting point between opposing surfaces of the structure defining the slot(s) 320B, it may be desirable from a manufacturing standpoint that the starting point(s) of the tapering sections 321 be sufficiently spaced from the (typically inner) surface from which the slot(s) 320B originates. Thus, in some embodiments, the starting point may be located at a point no less than 20%, or no less than about 20%, of the distance from the lower/inner and/or originating surface of the slot(s) to the upper/outer and/or terminating surface of the slot(s).

As discussed below in connection with later figures, other embodiments are contemplated in which the tapering surfaces/sections 321 may instead be straight or non-curved. In addition, in some embodiments, the curvature of the tapering sections 321 may extend in multiple dimensions. In other words, a semi-spherically curved surface may be formed within one or more of these sections 321 if desired. Additional details regarding these phase-compensating features can be found in U.S. patent application Ser. No. 17/370,922 titled PHASE-COMPENSATED WAVEGUIDES AND RELATED SENSOR ASSEMBLIES, the entire contents of which are hereby incorporated by reference herein.

As further illustrated best by FIG. 3, grooves 330B may, in some embodiments, include one or more portions that extend perpendicular to the elongated axis of slots 320B and/or grooves 322B, such as groove portions 332, which extend at one or both opposing ends of grooves 322B. In addition, a portion of one or more grooves 322B may extend into one or both ends of one or more of the slots 320B and/or grooves 322B, as shown at 333. Alternatively, one or both of these groove portions 332/333 may be separately formed rather than extending together with another groove, such as groove 330B.

This may be desired for certain applications and/or embodiments to allow all of the grooves and/or slots to be connected together for venting purposes. In other words, this may allow for connection of the air in the grooves and/or slots to the air in the housing of the assembly, which may prevent or at least inhibit pressure build up when the air heats up. If the grooves were not connected to the slots by these channels, then the air may become trapped in the grooves, which may expand and push the radome of the assembly (in embodiments in which the assembly is used for a vehicle RADAR sensor, for example) away.

Other features of TX section 317 may be similar to other TX sections previously discussed. Thus, an array of additional grooves 330B may be positioned on the opposing outermost edges of the opposing, slot-mimicking grooves 322B. Such grooves 330B may, or may not, comprise interconnecting groove sections for venting, as previously discussed.

The array of grooves 330A to the left, which is in between TX section 317 and RX section 315, may be considered a part of either section. Four grooves 330B are positioned on the right side of TX section 317, thereby delineating the outermost edge of this functional section, whereas three grooves 330A are positioned on the left side in between TX section 317 and RX section 315, thereby again either being considered an intermediate section or a functional part of either of these sections.

As mentioned above, although not visible in FIG. 3 or 4, in some embodiments, one or more of the various grooves 330B (and/or isolation grooves 330A) may have a different depth from one or more of the other grooves. For example, in some embodiments, shallower grooves may be interspersed throughout assembly 300, or any of the other embodiments depicted and/or described herein. In some such embodiments, the shallower grooves may be primarily, or exclusively, found in the TX section 317.

For example, in a particular contemplated embodiment, each of the single grooves 330B immediately adjacent to an antenna slot 320B may be shallower than some, most, or all of the other grooves. In addition, one (or, in other contemplated embodiments, a plurality) of isolation grooves 330B of an array on one or both outer ends of TX section 317 may be shallower than the other grooves 330B in such arrays and/or shallower than the isolation grooves 330A in RX section 315. Preferably, the shallower isolation grooves 330A in these arrays consist of only the innermost isolation grooves 330A.

Additional elements of assembly 300 can also be seen in the opposite plan view of FIG. 4. For example, in addition to the waveguides 370A and 370B created by the aforementioned rows of posts 360 (as mentioned above), FIG. 4 depicts a hub region 350 from which each of these waveguides initiates and/or terminates to allow for sending and receiving of electromagnetic signals. It should be understood that hub region 350 would typically include various electrical components, such as electromagnetic generation chips or other elements, that are not shown in the figures to avoid obscuring the disclosure. A suitable electromagnetic feed or transition structure may also be used to facilitate transitioning electromagnetic waves/signals to the waveguide grooves as needed.

It should also be understood that alternative embodiments are contemplated in which the slots 320B and/or grooves 322B oscillate in a non-smooth manner. For example, slots 320B and/or grooves 322B may define, or at least substantially define, a square wave in some contemplated embodiments.

In addition, the taper of sections 321 may extend the entire distance between the upper and lower surfaces of the portion/layer/structure defining the slots 320B and/or grooves 322B. Or, alternatively, the taper may start/stop at a particular point in between these two surfaces.

Various other alternative features/embodiments are also contemplated. For example, in some embodiments, a series of spaced slots may be provided rather than a single, elongated slot, for a given waveguide. Such spaced slots may, but need not, oscillate. In addition, the aforementioned tapered/angled sections/surfaces may be formed in some or all such spaced slots. For example, in some embodiments, the tapering sections may be formed in every slot but may alternate on sides such that every other slot and/or groove has a cutout/tapering section formed on an opposite side relative to the adjacent slot(s) and/or groove(s). In addition, arrays of grooves may be formed that resemble or mimic, in one aspect or more, the oscillation of the slots, rather than providing straight grooves, such as grooves 330B, for example.

As those of ordinary skill in the art will appreciate, antenna/waveguide/sensor assemblies incorporating the waveguide/antenna structures described herein may further comprise a PCB or other electromagnetic-generating element from which electromagnetic waves may be generated to feed one or more waveguide structures. These elements may be provided in a separate layer or, alternatively, may be provided in the same layer.

It should also be understood that, whereas the block structures shown in the accompanying figures are generally shown with a single groove, which may be thought of as providing a single "antenna" when coupled with one or more adjacent slots, any number of waveguide grooves and/or adjacent slot and/or antenna structures may be provided as desired, and each such waveguide and/or waveguide groove may be associated with a different antenna of the antenna block/assembly.

It should also be understood that whereas preferred embodiments may be used in connection with vehicle sensors, such as vehicle RADAR modules or the like, the principles disclosed herein may be used in a wide variety of other contexts, such as other types of RADAR assemblies, including such assemblies used in aviation, maritime, scientific applications, military, and electronic warfare. Other examples include point-to-point wireless links, satellite communication antennas, other wireless technologies, such as 5G wireless, and high-frequency test and scientific instrumentation. Thus, the principles disclosed herein may be applied to any desired communication sub-system and/or high-performance sensing and/or imaging systems, including medical imaging, security imaging and stand-off detection, automotive and airborne radar and enhanced passive radiometers for earth observation and climate monitoring from space.

As another contemplated alternative embodiment, the entire RX section may be shifted, such as shifted vertically, relative to the entire TX section. Thus, in the case of assembly 300, for example, a modified version of this embodiment is contemplated in which the entire TX section 317 is shifted down towards the bottom of the housing/body 310, in some cases as far towards the bottom of the housing/body 310 as possible given the available space and tolerances of the assembly. In some such embodiments, the outer RX slot may be shifted downward, in some cases by the same amount as the inner RX slot 320A' is upward, instead of shifting the inner RX slot 320A' upward.

Figure 5:
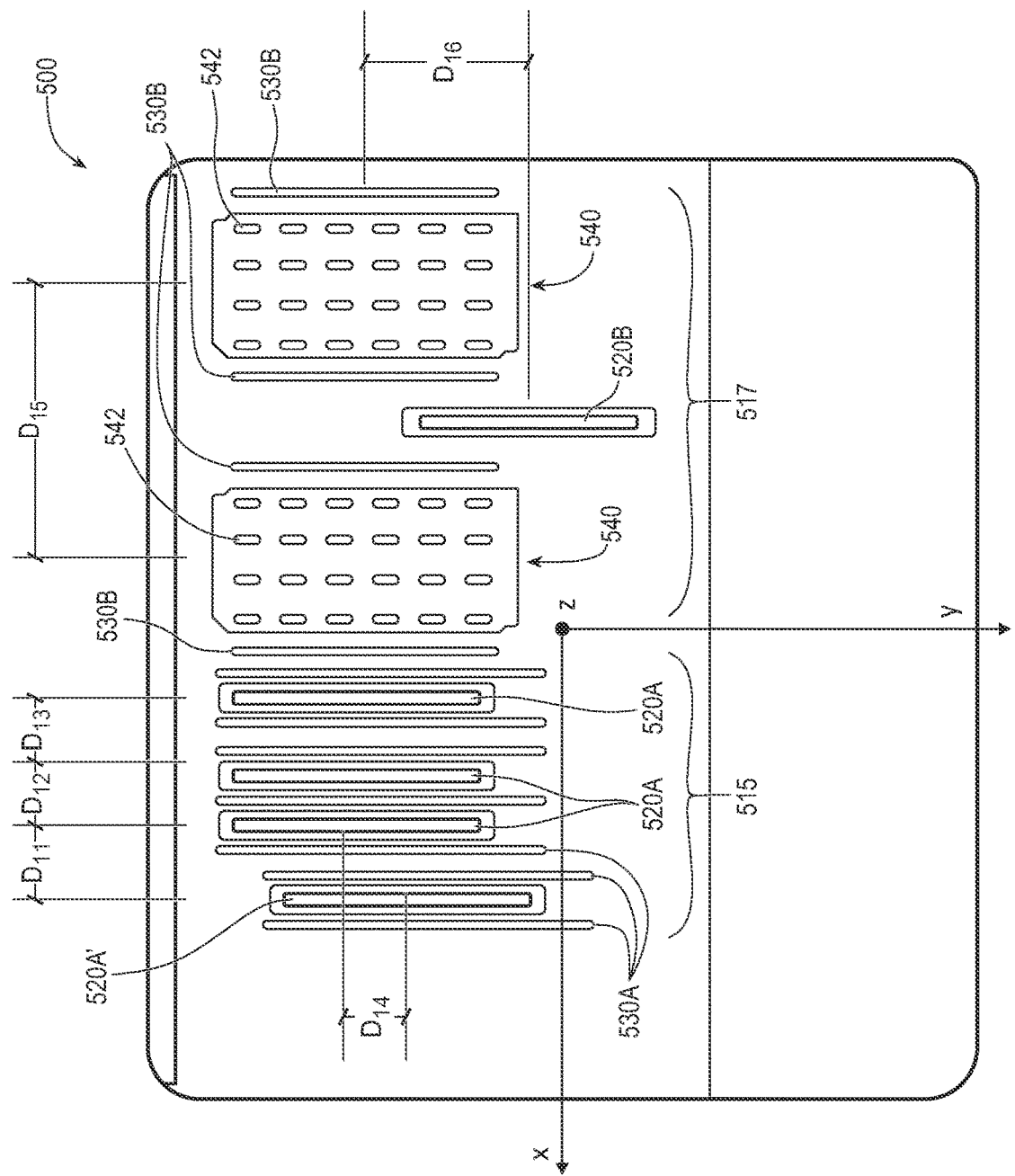
FIG. 5 is a plan view of an antenna module according to further embodiments.

FIG. 5 is a plan view of an alternative embodiment of a waveguide/antenna/sensor assembly 500. Assembly 500 again comprises a body, which may comprise a casting, layer, or the like. Assembly 500 further comprises an RX section 515 and a TX section 517.

The RX section 515 of assembly 500 comprises four antenna slots 520A. Each of the four antenna slots 520A has essentially the same shape—i.e., the same length and width. However, three of the antenna slots 520A are aligned with one another—i.e., they begin and end at the same points along the structure into which they are formed—and the remaining antenna slots (antenna slot 520A'), which is the leftmost antenna slot adjacent to the perimeter of the assembly 500, is shifted vertically downward relative to the other antenna slots 520A.

In some embodiments, the amount of vertical shift of antenna slot 520A' relative to the other antenna slots 520A of assembly 500 may be about 1 wavelength of the electromagnetic radiation used in the antenna module. Thus, for applications using the automotive RADAR band at 76 to 81 GHz, distance D14 may also be between about 3.7 mm and about 4 mm.

The horizontal distance between adjacent antenna slots in assembly 500 may vary. For example, the horizontal distance D11 between antenna slot 520A' and its adjacent antenna slot 520A may be about 1.5 wavelengths of the electromagnetic radiation used in the antenna module associated with assembly 500. Thus, for applications using the automotive RADAR band at 76 to 81 GHz, this distance D11 may be between about 5.5 mm and about 5.9 mm.

The distance D12 between the second and third antenna slots 520A may, in some embodiments, be about 1 wavelength of the electromagnetic radiation used in the antenna module, whereas the distance D13 between the third and fourth antenna slots 520A may, like D11, be about 1.5 wavelengths of the electromagnetic radiation used in the antenna module associated with assembly 500.

RX section 515 of assembly 500 further comprises a plurality of isolation grooves 530A. In this particular embodiment, there is a pair of such grooves 530A formed on either side of each respective antenna slot 520A. Additional grooves may be used in alternative embodiments, if desired. Each groove 530 extends substantially below the vertical position of the lower end of its respective, adjacent antenna slot 520A/520A'.

TX section 517 of assembly 500 may also comprise one or more antenna slots 520B, one or more high-gain and/or squinted antennas 540, and one or more isolation grooves 530B. More particularly, in the depicted embodiment, assembly 500 comprises a single antenna slot 520B positioned in between two adjacent high-gain/squinted antennae 540 and further comprises a single isolation groove 530B positioned in between each pair of adjacent antenna structures and on the opposing ends of TX section 517.

As with antenna 140, antennae 540 may each comprise an array of radiating slots 542 formed in a portion, such as a top layer, thereof, which antennae 540 may have one or more of the characteristics of a high-gain/squinted antenna as described above in connection with antennae 140. Antennae 540 may also, in preferred embodiments, be spaced apart by a distance D15 of about 5.5 wavelengths of the electromagnetic radiation used in the antenna module associated with assembly 500. Thus, for applications using the automotive RADAR band at 76 to 81 GHz, this distance D16 may be between about 20.3 mm and about 21.7 mm.

In addition, as shown in FIG. 5, the single elongated antenna slot 520B is vertically shifted (downward) relative to one or more other structures of the TX section 517, such as antennae 540. In some embodiments, this vertical shift may be by a distance D16. In some preferred embodiments, the vertical shift distance (D16 in the depicted embodiment) between the one of more elongated antenna slots of a TX section may be shifted relative to the one or more high-gain/squinted antennae of the TX section, and/or accompanying structures, such as isolation grooves, by as much as is allowed, or reasonably allowed (with distances for necessary tolerances and/or to maintain structural integrity) by the available space on the device/structure(s) incorporating the various slots/antenna/grooves.

In the depicted embodiment, antennae 540 are configured to produce narrow, azimuth patterns pointing at boresight. However, in alternative embodiments, two (or more) similar sets of high-gain antennae arrays may be used to provide squinted beams in two (or more) different directions, as desired.

Figure 6:
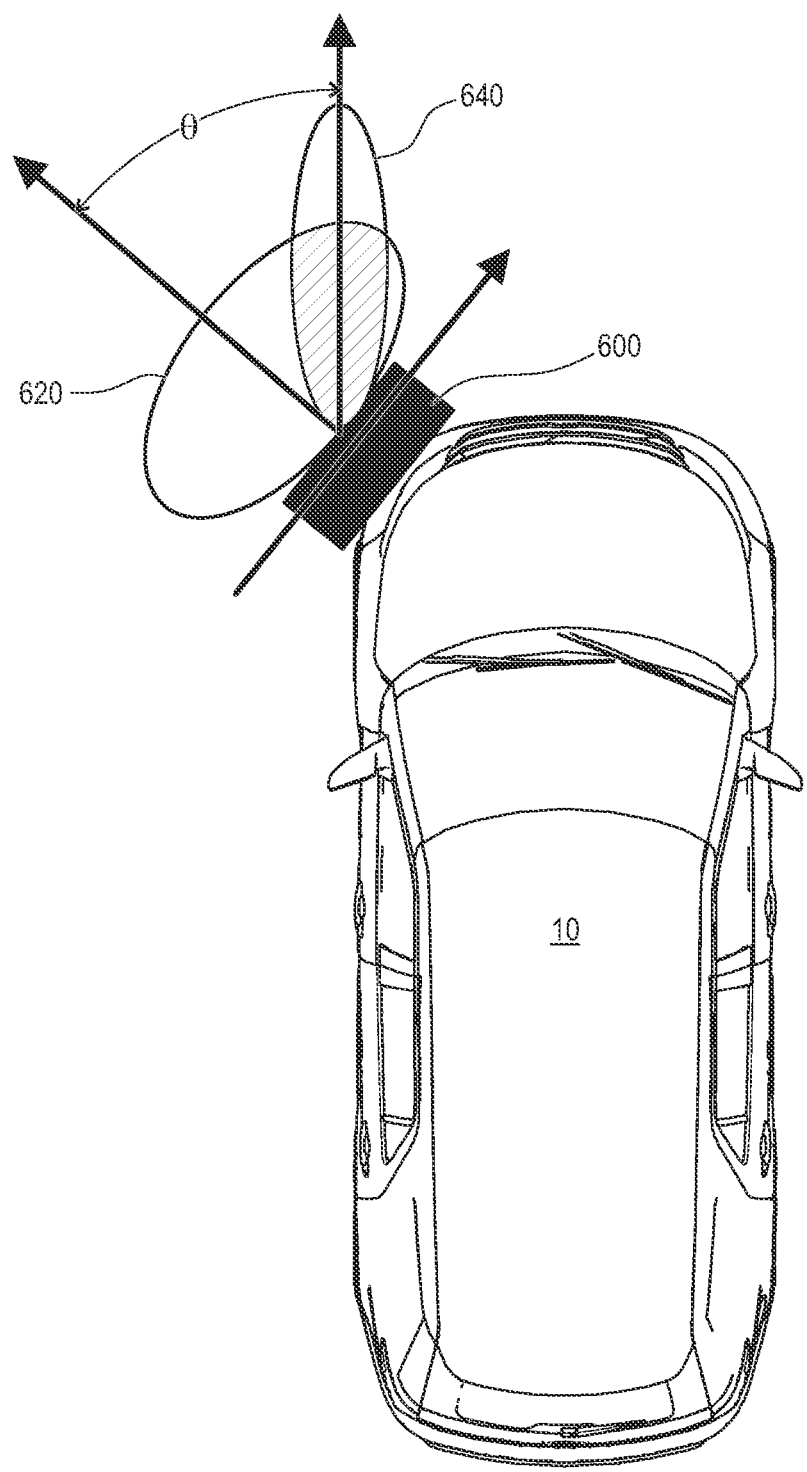
FIG. 6 is a diagram illustrating a possible placement, orientation, and TX beam scope and orientation associated with some RADAR module embodiments.

FIG. 6 illustrates a vehicle 10 having a sensor module 600, such as a RADAR module, incorporating features according to one or more of the embodiments disclosed herein. In this depicted embodiment, sensor module 600 is positioned at the front corner of vehicle 10. However, it is contemplated that the same sensor module 600 may be placed at other locations on vehicle 10 at strategic locations as desired.

Sensor module 600 may comprise one of the assemblies disclosed herein, or one or more of the features of any of these assemblies. For example, because sensor module 600 provides both a broad beam 620 and a narrow/squinted/high gain beam 640 having a squint angle of θ relative to the boresight direction, sensor module 600 may correspond generally to the configuration of assembly 100 of FIG. 1. This is because assembly 100 comprises a TX section 117 comprising a high-gain antenna 140 comprising an array of radiating slots 142. Antenna 140 may therefore correspond with the squinted beam 640 of FIG. 6. Similarly, antenna slots 120B of assembly 100 may deliver the electromagnetic signal that generates, and therefore correspond with, the broad beam 620 of FIG. 6.

Sensor module 600 is shown positioned on a front corner of vehicle 10 with the boresight direction pointed outward at an angle relative to the forward direction of motion of the vehicle 10. This may be a useful position and orientation because the squinted beam 640 may be angled back towards the forward direction to provide for long range detections in front of vehicle 10 during travel. In some embodiments, the squint angle θ and/or angle of positioning of the module 600 may be selected such that the squinted beam 640 is aligned, or at least substantially aligned, with the forward direction, as shown in FIG. 6.

When combined with one or more antennae configured to ultimately, along with the requisite circuitry to generate the signal, result in a broad, short-range beam such as beam 620, vehicle 10 may be able to more effectively and/or efficiently detect things relatively close yet laterally adjacent to it— such as a vehicle in a neighboring lane—and also detect objects that are rather distant, but directly in front of vehicle 10, such as stopped vehicles and/or an accident ahead.

It should be understood that, in contemplated alternative configurations, sensor module 600 may be positioned on the rear of the vehicle, such as a rear corner, or at any other desired location that may warrant a combination of a long-range/squinted beam with a selected squint angle for detecting relatively distant objects, combined (in some cases overlapping) with a short-range, broad beam for detecting relatively proximate objects.

Figure 7:
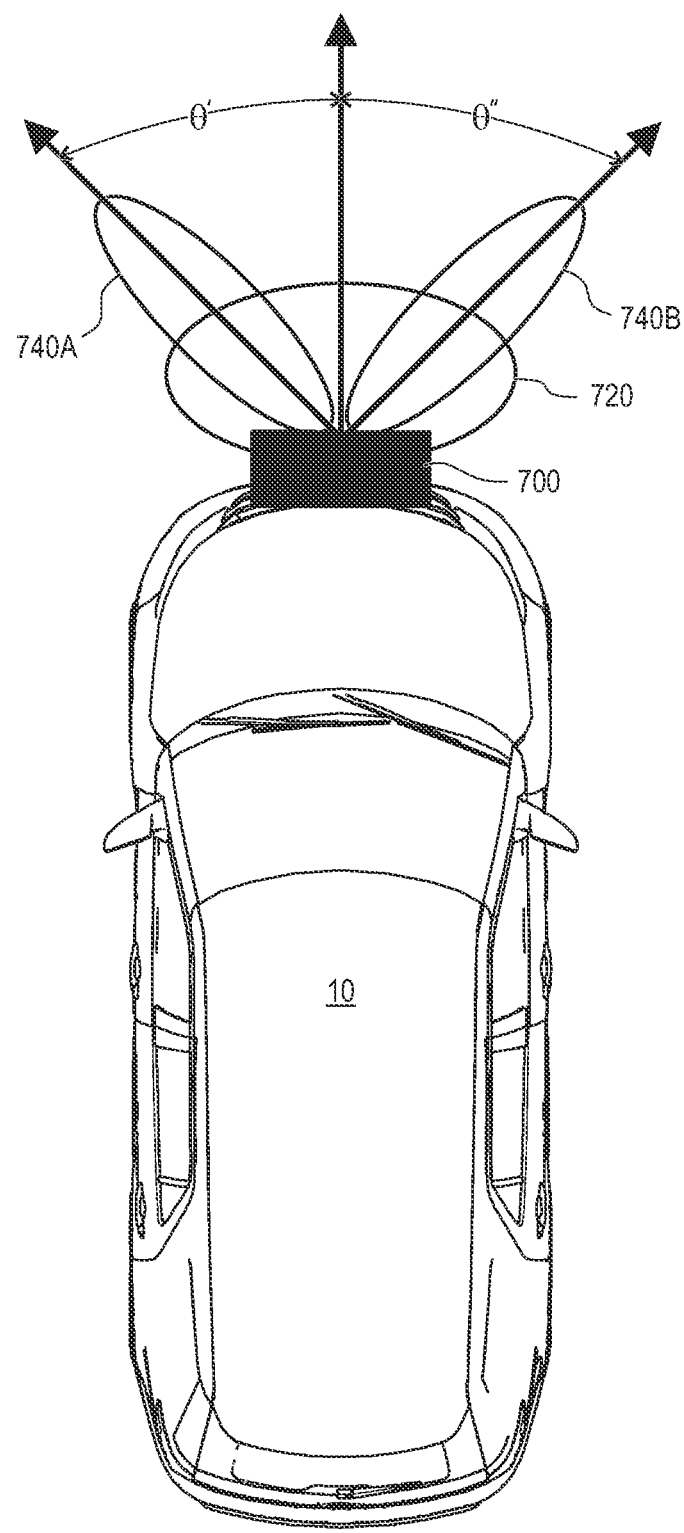
FIG. 7 is a diagram illustrating a possible placement, orientation, and TX beam scope and orientation associated with other RADAR module embodiments.

FIG. 7 illustrates a vehicle 10 having an alternative sensor module 700, such as a RADAR module, incorporating features according to one or more of the embodiments disclosed herein. In this depicted embodiment, sensor module 700 is positioned at the front center of vehicle 10. However, it is contemplated that the same sensor module 700 may again be positioned at other locations on vehicle 10 at strategic locations as desired.

Sensor module 700 may also comprise one or more of the features of one or more of the assemblies disclosed herein. For example, antenna slot 520B of the assembly of FIG. 5 may deliver the electromagnetic signal that generates, and therefore correspond with, the broad beam 720 of FIG. 7.

Sensor module 700 is shown positioned on a front center of vehicle 10 with the boresight direction pointed in the forward direction of motion of the vehicle 10. This may be a useful position and orientation for certain purposes because the squinted beams 740A and 740B may be angled outward slightly to provide for relatively long-range detections in front, but not directly in front, of vehicle 10 during travel. In some embodiments, the squint angles 8' and 8" may be selected such that the squinted beams 740A and 740B provide a desired amount of targeted viewing of the vehicle's upcoming turns, for example.

When combined with one or more antennae configured to ultimately, along with the requisite circuitry to generate the signal, result in a broad, short-range beam such as beam 720, vehicle 10 of FIG. 7 may be able to more effectively and/or efficiently detect objects and/or the path of the vehicle up ahead, along with provide for short range detections directly in front of the vehicle.

It should be understood that, in contemplated alternative configurations, sensor module 700 may be positioned on the rear of the vehicle, such as at the rear center of the vehicle, or at any other desired location that may warrant a combination of two (or more in other embodiments) long-range/squinted beams with a selected squint angles for detecting relatively distant objects, combined (in some cases overlapping) with a short-range, broad beam for detecting relatively proximate objects.

Figure 8:
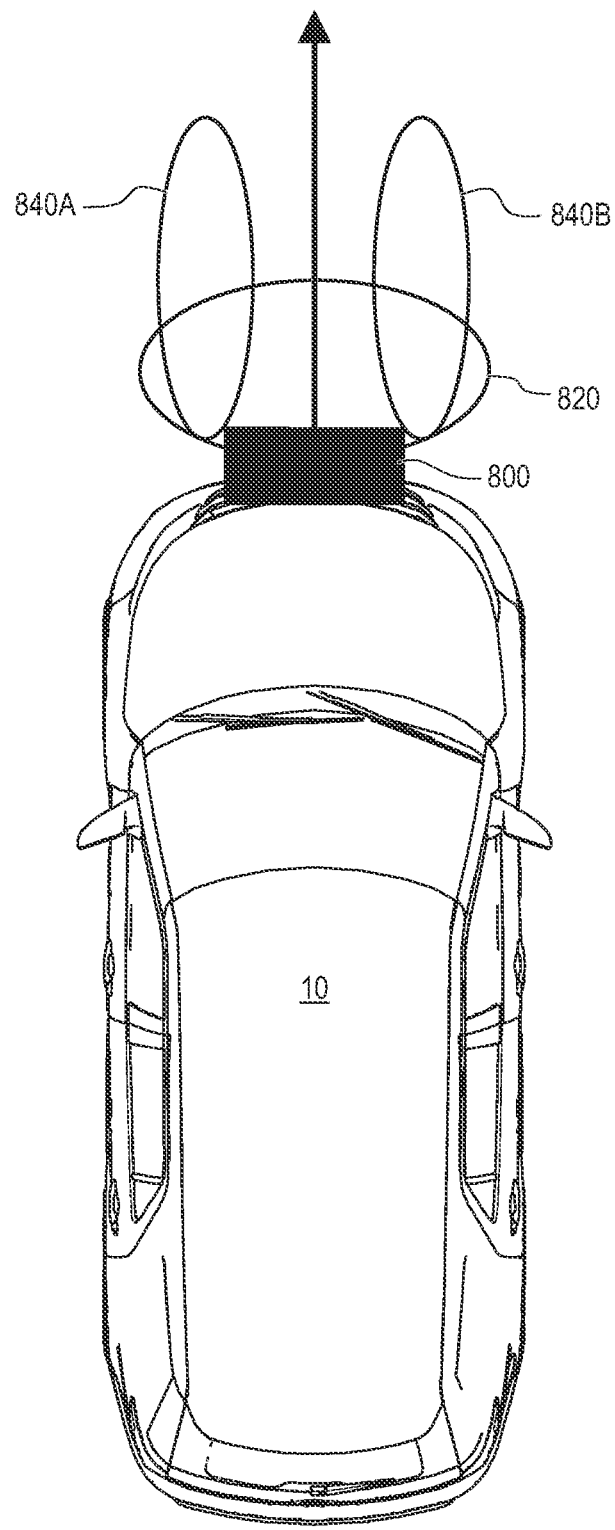
FIG. 8 is a diagram illustrating a possible placement, orientation, and TX beam scope and orientation associated with still other RADAR module embodiments.

FIG. 8 illustrates a vehicle 10 having another alternative sensor module 800, such as a RADAR module, incorporating features according to one or more of the embodiments disclosed herein. In this depicted embodiment of this figure, sensor module 800 is, like sensor module 700, positioned at the front center of vehicle 10. However, it is contemplated that sensor module 800 may again be positioned at other locations on vehicle 10 at strategic locations as desired.

Sensor module 800 may also comprise one of the assemblies disclosed herein, or one or more of the features of any of these assemblies. For example, because sensor module 800 provides both a broad beam 820 and two narrow/squinted/high gain beams 840A/840B, sensor module 800 may also include one or more of the features of the configuration of the assembly of FIG. 5. For example, antenna slot 520B of the assembly of FIG. 5 may deliver the electromagnetic signal that generates, and therefore correspond with, the broad, short-range beam 820 of FIG. 8.

Sensor module 800 is shown positioned on a front center of vehicle 10 with the boresight direction pointed in the forward direction of motion of the vehicle 10. This may be a useful position and orientation for certain purposes because the high-gain, long-range beams 840A and 840B may extend a relatively long distance directly in front, of vehicle 10 during travel. In some embodiments, one or both of the high-gain, long-range beams 840A and 840B may extend parallel, or at least substantially parallel, to the forward direction of the vehicle. Alternatively, relatively small squint angles for one or both of the high-gain, long-range beams 840A and 840B may be selected such that these beams provide desired combination of distance in the forward direction and targeted viewing of the surroundings of the upcoming forward direction.

When combined with one or more antennae configured to ultimately, along with the requisite circuitry to generate the signal, result in a broad, short-range beam such as beam 820, vehicle 10 of FIG. 8 may be able to more effectively and/or efficiently detect objects and/or the path of the vehicle a relatively long distance up ahead (relative to module 700, at least), along with provide for short range detections directly in front of the vehicle.

It should be understood that, in contemplated alternative configurations, sensor module 800 may also, or alternatively, be positioned on the rear of the vehicle, such as at the rear center of the vehicle, or at any other desired location that may warrant a combination of two (or more in other embodiments) long-range, boresight or just slightly squinted beams for detecting relatively distant objects, combined (in some cases overlapping) with a short-range, broad beam for detecting relatively proximate objects.

Figure 9:
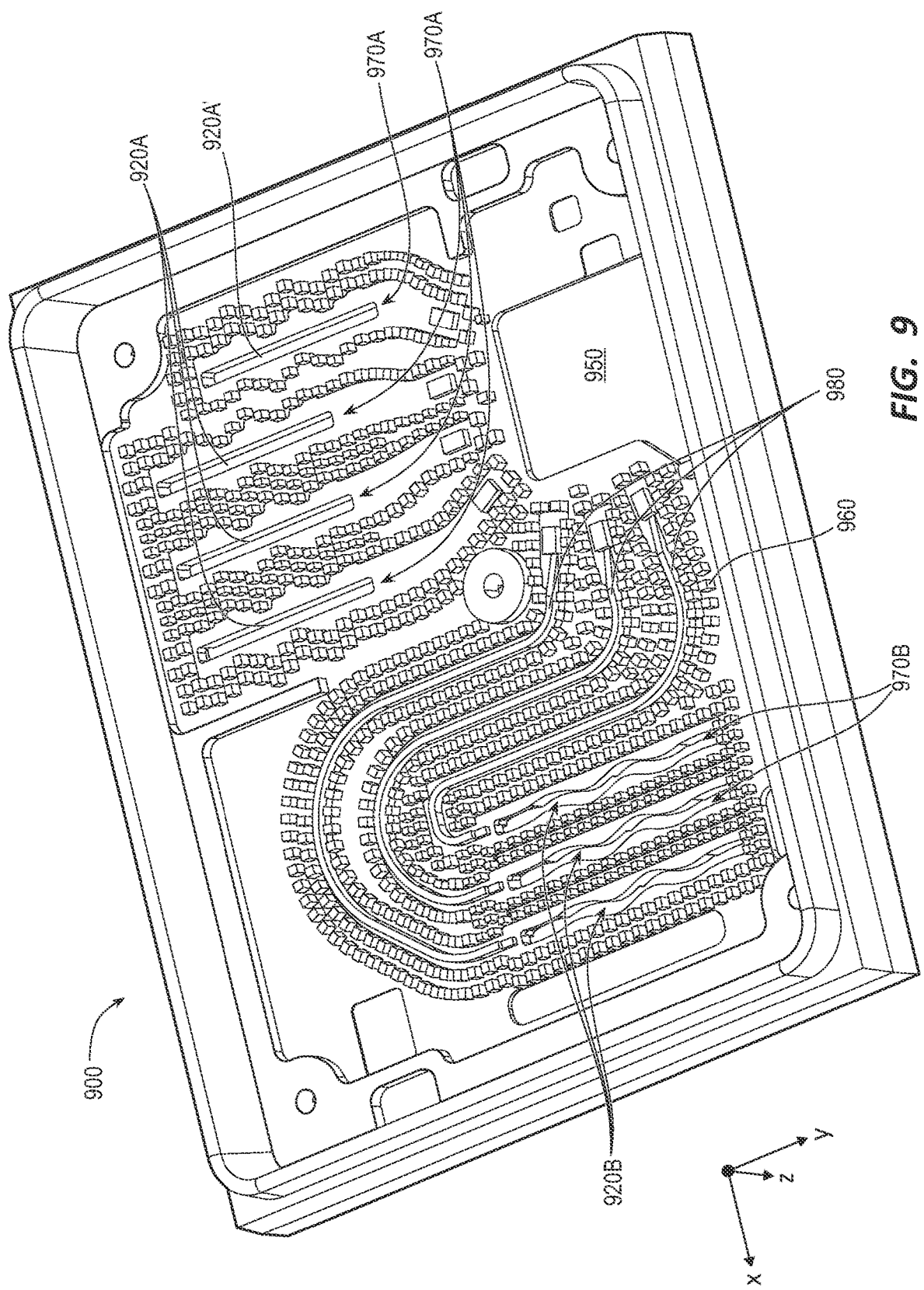
FIG. 9 is a perspective view of a first side of an antenna module according to other embodiments.
Figure 10:
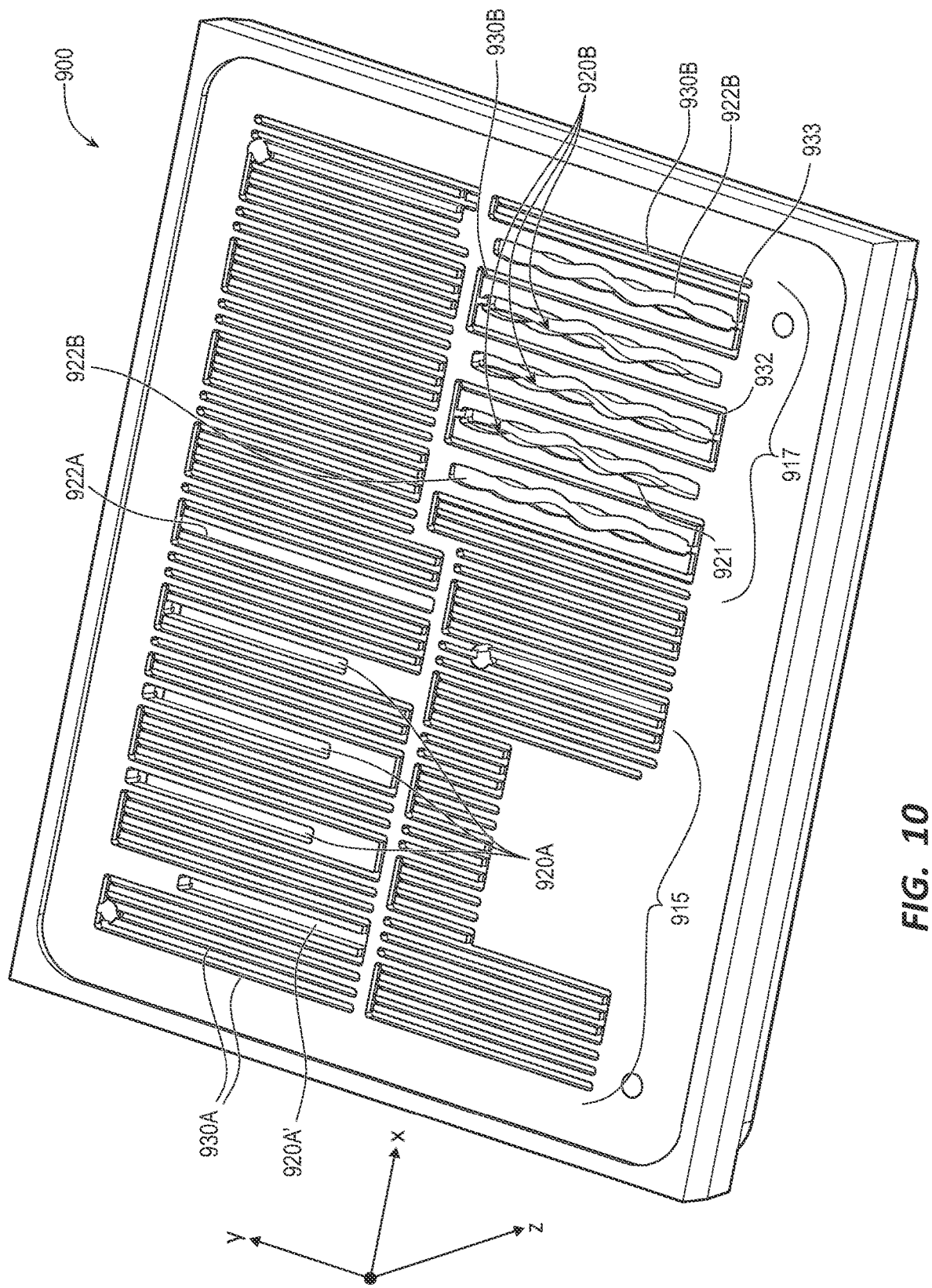
FIG. 10 is a perspective view of a second side of the antenna module of FIG. 9 opposite from the first side.

FIGS. 9 and 10 depict yet another embodiment of an antenna/sensor/waveguide assembly 900. FIG. 9 depicts assembly 900 from the side similar to that of assembly 300 in FIG. 4. As shown in this figure, waveguides 970A and 970B are formed in between opposing rows of posts 960 from a hub region 950 from which each of these waveguides initiates and/or terminates to allow for sending and receiving of electromagnetic signals. As mentioned above, hub region 950 would typically include various electrical components, such as electromagnetic generation chips or other elements, that are not shown in the figures to avoid obscuring the disclosure. A suitable electromagnetic feed or transition structure may also be used to facilitate transitioning electromagnetic waves/signals to the waveguide grooves as needed.

Along the TX section 917 (see FIG. 10), a waveguide ridge 980 extends from the hub region 950 within each of the waveguide grooves 970B. These waveguide ridges 980 terminate adjacent to the antenna slots 920B, which are oscillating antenna slots that oscillate to and from the opposing walls defined by posts 960 in an intermittent manner, as previously described, and which may also comprise tapering sections that may comprise a stepped taper or ledge, or may comprise a smoothly transitioning taper, as also described above.

On the RX side of the assembly, waveguide grooves 970A include straight antenna slots 920A and one vertically shifted antenna slot 920A', as previously described.

FIG. 10 depicts the upper side of assembly 900—i.e., the side that would typically face the exterior of the assembly 900 as part of a RADAR or other sensor assembly. As shown in this figure, the assembly may be divided into two functional sections, namely an RX section 915 and a TX section 917. However, unlike previous embodiments, these two functional sections are vertically shifted with respect to one another. Thus, RX section 915 is positioned in the upper left corner of the assembly 900 and TX section 917 is positioned in the lower right corner of the assembly 900.

As previously described, an array of isolation grooves 930A is positioned adjacent to each antenna slot 920A and in between each pair of adjacent antenna slots 920A, and on either side of the vertically shifted antenna slot 920A', which is shifted downward in an amount that may be equal, or at least substantially equal, to any of the vertical shifts of an RX antenna slot previously mentioned.

In the depicted embodiment, isolation grooves 930A are also positioned both below the RX section 915 and above the TX section 917, which may further improve signal isolation and/or functionality. Some of the isolation grooves 930A that are positioned below antenna slots 920A and 920A' may be shortened, which may provide a region that is free from slots/grooves, which region may correspond with the hub region 950 on the opposite side.

One or more grooves 922A may also be provided, which groove(s) 922A may, as previously discussed, resemble or mimic an antenna slots without actually comprising a slot. Groove 922A may be substantially longer than slots 920A. More particularly, groove 922A may extend from the lower end of slot 920A' to the upper end of slots 920A.

In addition, one or more of the isolation grooves 930A may be interconnected with one another and/or interconnected with antenna slots 920A along their respective ends, as shown in FIG. 10, if desired.

TX section 917 again comprises three antenna slots 920B, each of which comprises an oscillating slot and each of which comprises a phase-compensating feature, such as a tapered and/or angled section/surface 921 that is formed along both opposing sidewalls defining each antenna slot 920B at respective points of maxima for the oscillating pattern of the respective slot.

In the depicted embodiment, this phase-compensating feature is, more specifically, accomplished by applying one or more angled and/or tapered sections, such as tapered grooves or cutouts, along the slots. Thus, the depicted embodiment illustrates a tapered and/or angled section/surface 921 that is formed along both opposing sidewalls defining each antenna slot 920B, along with each slot-mimicking groove 922B, at respective points of maxima for the oscillating pattern of the respective slot/groove. Any of the characteristics, features, and/or alternative embodiments of such tapered, angled, and/or otherwise phase-compensating features mentioned herein may apply to sections 921.

As further illustrated best by FIG. 10, grooves 930B may, in some embodiments, include one or more portions that extend perpendicular to the elongated axis of slots 920B and/or grooves 922B, such as groove portions 932, which extend at one or both opposing ends of grooves 922B. In addition, a portion of one or more grooves 922B may extend into one or both ends of one or more of the slots 920B and/or grooves 922B, as shown at 933. Alternatively, one or both of these groove portions 932/933 may be separately formed rather than extending together with another groove, such as groove 930B. The distances between the various slots and grooves of assembly 900 may be as described above in connection with one or more of the previously described embodiments.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present inventions should, therefore, be determined only by the following claims.

The invention claimed is:

1. An antenna module for a vehicle sensor, comprising:
a receive (RX) array of elongated RX antenna slots;
a transmit (TX) array of TX antenna slots, the TX array of TX antenna slots comprising:

an elongated TX antenna slot, wherein the elongated TX antenna slot is shifted vertically in a vertical direction along an axis of the elongated TX antenna slot relative to each of the elongated RX antenna slots of the RX array; and a high-gain TX antenna array positioned adjacent to the elongated TX antenna slot, the high-gain TX antenna array comprising a plurality of high-gain antenna slots formed in a plurality of columns, wherein each of the plurality of high-gain antenna slots is shorter in length in a direction along the axis of the elongated TX antenna slot than the elongated TX antenna slot.

2. The antenna module of claim 1, wherein the TX array of TX antenna slots further comprises a second elongated TX antenna slot.

3. The antenna module of claim 2, wherein the high-gain TX antenna array is positioned in between the elongated TX antenna slot and the second elongated TX antenna slot.

4. The antenna module of claim 3, wherein the second elongated TX antenna slot is shifted vertically in the vertical direction along the axis of the elongated TX antenna slot relative to the elongated TX antenna slot.

5. The antenna module of claim 4, wherein the second elongated RX antenna slot is positioned adjacent to a peripheral edge of the antenna module.

6. The antenna module of claim 3, wherein the antenna module comprises a vehicle RADAR module, and wherein the second elongated TX antenna slot is spaced apart in a horizontal direction perpendicular to the vertical direction from the elongated TX antenna slot by a distance corresponding to about five wavelengths of the electromagnetic radiation used in the antenna module.

7. The antenna module of claim 1, wherein the high-gain TX antenna array comprises a squinted-beam TX antenna array configured to direct an electromagnetic signal at an angle relative to an electromagnetic signal associated with the elongated TX antenna slot.

8. A vehicle antenna assembly, comprising:
a receive (RX) array of elongated RX antenna slots;
a transmit (TX) array of TX antenna slots, the TX array of TX antenna slots comprising:
a boresight beam array of one or more TX antenna slots configured to direct a first electromagnetic signal in a first direction; and
a squinted beam array of TX antenna slots configured to direct a second electromagnetic signal in a second direction at an angle relative to the first electromagnetic signal and overlapping with the first electromagnetic signal,
wherein the TX array of TX antenna slots further comprises a second squinted beam array of TX antenna slots, wherein the second squinted beam array of TX antenna slots is configured to direct a third electromagnetic signal in a third direction at a second angle relative to the first electromagnetic signal and overlapping with the first electromagnetic signal, wherein the second angle extends in a direction opposite the first angle relative to the first direction, and wherein the boresight beam array of TX antenna slots is vertically shifted along an elongated axis of the boresight beam array with respect to at least one of the squinted beam array and the second squinted beam array.

9. The vehicle antenna assembly of claim 8, wherein the second angle is between 30 degrees and 60 degrees.

10. The vehicle antenna assembly of claim 8, wherein the boresight beam array of one or more TX antenna slots is vertically shifted along the elongated axis of the boresight beam array with respect to both the squinted beam array and the second squinted beam array.

11. The vehicle antenna assembly of claim 10, wherein the boresight beam array comprises only a single TX antenna slot.

12. The vehicle antenna assembly of claim 8, wherein the boresight beam array comprises at least one TX antenna slot that is vertically shifted relative to at least one other TX antenna slot along an axis of the at least one TX antenna slot.

13. The vehicle antenna assembly of claim 12, wherein the boresight beam array comprises only two TX antenna slots, and wherein both of the two TX antenna slots fall within a vertical footprint of the squinted beam array.

14. A vehicle antenna assembly, comprising:
a receive (RX) array of elongated RX antenna slots, wherein at least one of the elongated RX antenna slots comprises a shifted, elongated RX antenna slot that is shifted vertically in a vertical direction along an axis of the shifted, elongated RX antenna slot relative to each of the other elongated RX antenna slots of the RX array;
a transmit (TX) array of elongated TX antenna slots that differ in both shape and length relative to each of the elongated RX antenna slots of the RX array.

15. The vehicle antenna assembly of claim 14, wherein each of the elongated TX antenna slots intermittently oscillates on opposite sides of its respective elongated axis along at least a portion of its respective elongated axis.

16. The vehicle antenna assembly of claim 15, wherein each of the elongated RX antenna slots extends at least substantially along a straight line.

17. The vehicle antenna assembly of claim 14, wherein the vehicle antenna module comprises a RADAR module, and wherein the shifted, elongated RX antenna slot is shifted by a distance corresponding to about one-half of a wavelength of the electromagnetic radiation used in the vehicle antenna module.

18. The vehicle antenna assembly of claim 14, wherein each of the elongated RX antenna slots is at least substantially equally spaced apart from one another in a horizontal direction perpendicular to the vertical direction.

19. A vehicle antenna assembly, comprising:
a receive (RX) array of elongated RX antenna slots;
a transmit (TX) array of TX antenna slots, the TX array of TX antenna slots comprising:
a boresight beam array of one or more TX antenna slots configured to direct a first electromagnetic signal in a first direction; and
a squinted beam array of TX antenna slots configured to direct a second electromagnetic signal in a second direction at an angle relative to the first electromagnetic signal and overlapping with the first electromagnetic signal,
wherein the boresight beam array comprises at least one TX antenna slot that is vertically shifted relative to at least one other TX antenna slot along an axis of the at least one TX antenna slot, wherein the boresight beam array comprises only two TX antenna slots, and wherein both of the two TX antenna slots fall within a vertical footprint of the squinted beam array.

* * * * *